(12) United States Patent
Wang

(10) Patent No.: US 12,096,162 B2
(45) Date of Patent: Sep. 17, 2024

(54) IMAGE PROCESSING METHOD AND APPARATUS, TERMINAL AND STORAGE MEDIUM

(71) Applicant: Tencent Technology (Shenzhen) Company Limited, Guangdong (CN)

(72) Inventor: Yiming Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 472 days.

(21) Appl. No.: 17/380,937

(22) Filed: Jul. 20, 2021

(65) Prior Publication Data

US 2021/0352253 A1  Nov. 11, 2021

Related U.S. Application Data

(63) Continuation of application No. PCT/CN2020/086934, filed on Apr. 26, 2020.

(30) Foreign Application Priority Data

May 9, 2019  (CN) .......................... 201910386977.4

(51) Int. Cl.
*H04N 9/67* (2023.01)
*G06T 5/40* (2006.01)
(Continued)

(52) U.S. Cl.
CPC .............. *H04N 9/67* (2013.01); *G06T 5/40* (2013.01); *G06T 5/92* (2024.01); *G06T 7/90* (2017.01); *G06T 2207/10024* (2013.01)

(58) Field of Classification Search
CPC . G06T 5/009; G06T 2207/10008; G06T 5/40; G06T 2207/10024; G06T 7/90
See application file for complete search history.

(56) References Cited

U.S. PATENT DOCUMENTS 6,018,589 A  1/2000 Hyodo
6,204,940 B1*  3/2001 Lin ........................ H04N 1/407
358/506

(Continued)

FOREIGN PATENT DOCUMENTS

CN  103200389 A  7/2013
CN  107613277 A  1/2018
(Continued)

OTHER PUBLICATIONS

International Search Report and Written Opinion for priority application No. PCT/CN2020/086934, dated Jul. 28, 2020, 10p, in Chinese Language.

(Continued)

*Primary Examiner* — Ross Varndell
(74) *Attorney, Agent, or Firm* — Crowell & Moring LLP

(57) ABSTRACT

Embodiments of this disclosure disclose an image processing method and apparatus, a terminal, and a storage medium. The method includes: obtaining a to-be-processed negative image and initial color values of pixels in the negative image in a first color space; inverting the negative image to obtain inverted image data, inverted color values of pixels in the inverted image data being determined according to the initial color values of the pixels in the negative image; performing value equalization on intermediate color values of the pixels in a range corresponding to a second color space according to the inverted image data, to obtain digital color values of the pixels; and obtaining digital image data of the negative image according to the digital color values of the pixels.

15 Claims, 13 Drawing Sheets

(51) Int. Cl.
*G06T 5/92* (2024.01)
*G06T 7/90* (2017.01)

(56) References Cited

U.S. PATENT DOCUMENTS

| | | | | |
|---|---|---|---|---|
| 6,295,115 | B1 * | 9/2001 | Zhang | H04N 1/60 |
| | | | | 358/521 |
| 6,433,898 | B1 * | 8/2002 | Bestmann | H04N 1/6027 |
| | | | | 358/518 |
| 8,654,192 | B2 | 2/2014 | Borg | |

FOREIGN PATENT DOCUMENTS

| | | |
|---|---|---|
| CN | 108764345 A | 11/2018 |
| CN | 110084767 A | 8/2019 |
| WO | WO 2020/224459 A1 | 11/2020 |

OTHER PUBLICATIONS

English Language translation of the International Search Report for priority application No. PCT/CN2020/086934, dated Jul. 28, 2020, 2p.
Concise Explanation of Relevance in the Written Opinion of International Search Report for PCT/CN2020/086934, dated Jul. 28, 2020, 1p.
Extended European Search Report for European application No. 20802792.0 dated Mar. 10, 2022, 13p.
EP communication regarding supplementary EP Search Report for EP application No. 20802792.0 dated Mar. 29, 2022, 1p.
Gupta, Ashish et al., "Image Enhancement Using Histogram Equalization of Saturation in HSV Color Space," *International Journal of Industrial Electronics and Electrical Engineering*, May 5, 2017, vol. 5, No. 5, pp. 12-14, ISSN: 2347-6982, found at http://pep.ijieee.org.in/journal_pdf/11-374-150003360112-14.pdf.
Examination Report for European application No. 20802792.0 dated Oct. 31, 2023, 14p.

* cited by examiner

IMAGE PROCESSING METHOD AND APPARATUS, TERMINAL AND STORAGE MEDIUM

RELATED APPLICATIONS

This disclosure is continuation of PCT Application No. PCT/CN2020/086934, filed Apr. 26, 2020 and entitled "IMAGE PROCESSING METHOD AND DEVICE, TERMINAL AND STORAGE MEDIUM," which claims priority to Chinese Patent Application No. 201910386977.4, entitled "IMAGE PROCESSING METHOD AND APPARATUS, TERMINAL, AND STORAGE MEDIUM" filed with the National Intellectual Property Administration, PRC on May 9, 2019. The above applications are incorporated herein by reference in their entireties.

TECHNICAL FIELD

This disclosure relates to the field of image processing technologies, and in particular, to an image processing method and apparatus, a terminal, and a storage medium.

BACKGROUND

A film, also referred to as a photographic film, is an imaging material. Negative films are most common in films. The so-called negative film is a film that records, during imaging, colors opposite to true colors of a photographed object. Currently, methods for converting a negative film into a digital image mainly include the following two solutions. The first one is to develop a negative film by using a darkroom development technology to obtain a paper photograph, and then scan the paper photograph with a scanner to obtain a digital image. The second one is to train a neural network model by using a machine learning algorithm and call the trained neural network model to perform color restoration on a to-be-processed negative image to obtain a digital image.

SUMMARY

Embodiments of this disclosure provide an image processing method, including:

obtaining a to-be-processed negative image, which comprises a plurality of pixels and initial color values of the plurality of pixels in the negative image in a first color space;

inverting the negative image to obtain inverted image data, the inverted image data comprising inverted color values of the plurality of pixels and the inverted color values being determined according to the initial color values of the plurality of pixels in the negative image;

performing value equalization on intermediate color values of the plurality of pixels in a range corresponding to a second color space according to the inverted image data, to obtain digital color values of the plurality of pixels; and obtaining digital image data of the negative image according to the digital color values of the plurality of pixels.

The embodiments of this disclosure further provide an image processing apparatus, including:

an obtaining unit, configured to obtain a to-be-processed negative image and initial color values of pixels in the negative image in a first color space; and a processing unit, configured to invert the negative image to obtain inverted image data, inverted color values of pixels in the inverted image data being determined according to the initial color values of the pixels in the negative image, the processing unit being configured to perform value equalization on intermediate color values of the pixels in a range corresponding to a second color space according to the inverted image data, to obtain digital color values of the pixels, and the processing unit being configured to obtain digital image data of the negative image according to the digital color values of the pixels.

The embodiments of this disclosure further provide an intelligent terminal, including a processor, an input device, an output device, and a memory, the processor, the input device, the output device, and the memory being connected to each other, the memory being configured to store a computer program, the computer program including program instructions, and the processor being configured to invoke the program instructions to perform the image processing methods disclosed herein.

The embodiments of this disclosure further provide a non-transitory computer storage medium, storing computer program instructions, the computer program instructions being adapted to be loaded by a processor to perform the image processing methods disclosed herein.

Embodiments of this disclosure still discloses an terminal device, comprising:

at least one processor; and a memory, the processor and the memory being electrically coupled to each other, the memory being configured to store at least one computer program, and the processor being configured to execute the computer program to cause the terminal device to perform the steps, comprising:

obtaining a to-be-processed negative image, which comprises a plurality of pixels and initial color values of the plurality of pixels in a first color space;

inverting the negative image to obtain inverted image data, the inverted image data comprising inverted color values of the plurality of pixels and the inverted color values being determined according to the initial color values of the plurality of pixels;

performing value equalization on intermediate color values of the plurality of pixels in a range corresponding to a second color space according to the inverted image data to obtain digital color values of the plurality of pixels; and obtaining digital image data of the negative image according to the digital color values of the plurality of pixels.

Embodiments of this disclosure still discloses a non-transitory computer-readable storage medium, storing computer program instructions, the computer program instructions being adapted to be loaded by a processor to cause a device to perform the steps comprising:

obtaining a to-be-processed negative image, which comprises a plurality of pixels and initial color values of the plurality of pixels in a first color space;

inverting the negative image to obtain inverted image data, the inverted image data comprising inverted color values of the plurality of pixels and the inverted color values being determined according to the initial color values of the plurality of pixels;

performing value equalization on intermediate color values of the plurality of pixels in a range corresponding to a second color space according to the inverted image data to obtain digital color values of the plurality of pixels; and obtaining digital image data of the negative image according to the digital color values of the plurality of pixels.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from these accompanying drawings without creative efforts.

DESCRIPTION OF EMBODIMENTS

In a process of converting a to-be-processed negative film into a digital image, it is found that an entire procedure of using a darkroom development technology is relatively complex, and it requires a professional technician to implement development of the negative film. In addition, for performing color restoration on the to-be-processed negative image by using a trained neural network model, a lot of negative images are needed as sample images. Because negatives are rarely produced, it is relatively difficult to collect the sample images.

The embodiments of this disclosure provide an image processing method. In the image processing method, a negative image may be converted into a digital image to not only save a user time in taking a negative to an image development store and in waiting for a professional technician to develop the negative by using a darkroom development technology, but also improve convenience in converting a negative image into a digital image.

Figure 1A:
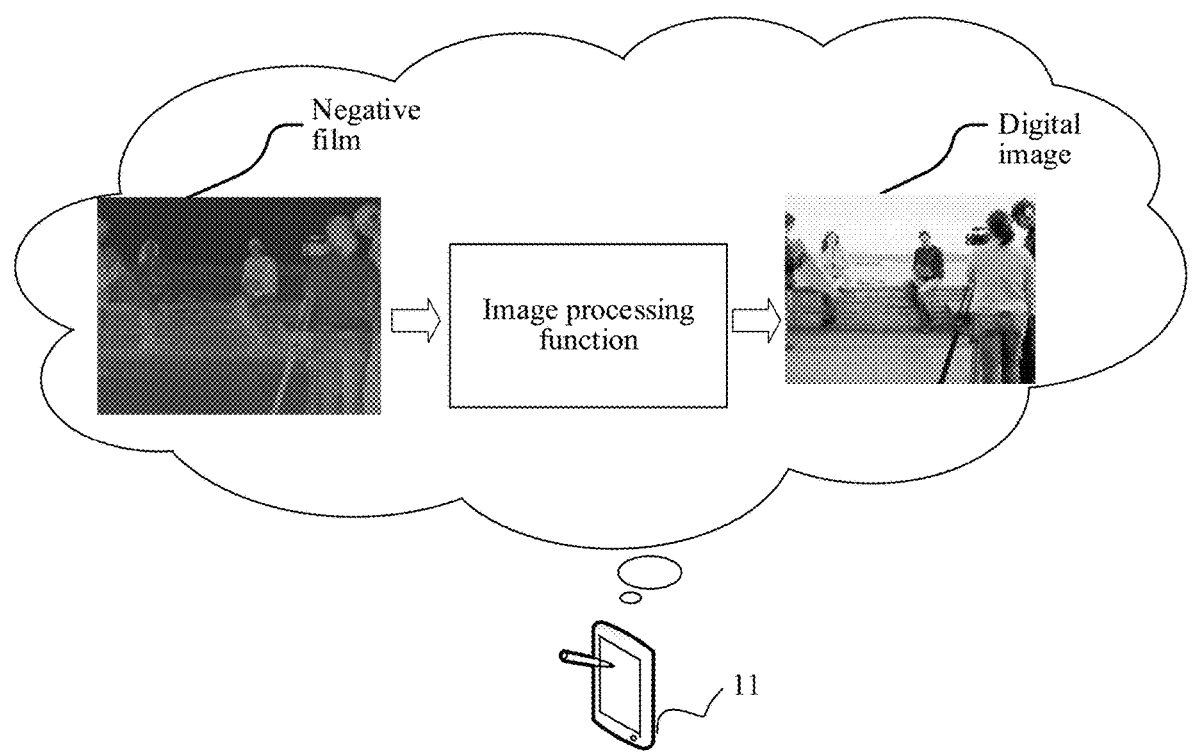
FIG. 1A is a diagram of an application scenario of an image processing function according to an embodiment of this disclosure.

In this embodiment of this disclosure, the embodiments of this disclosure provide an image processing method that can be performed by a terminal 11. As shown in FIG. 1A, the terminal 11 provides an image processing function for a user to implement the image processing method provided by this embodiment of this disclosure to convert a negative image into a digital image.

The terminal 11 may include, but is not limited to: a portable mobile terminal such as a smartphone, a tablet computer, or a laptop computer, a desktop computer, and the like.

In an implementation, the image processing function provided by the terminal 11 may be added as an independent functional module to any application (APP) on the terminal. For example, the image processing function may be added as an independent functional module to a camera APP, so that the user can enable the image processing function in a setting interface (or a photographing interface) of the camera APP. In another example, the image processing function may be added as an independent functional module to an instant messaging APP, so that the user can enable the image processing function in a setting interface (or a session interface) of the instant messaging APP. In an implementation, the image processing function may alternatively be added as an independent system function in the terminal to a system function option bar in the terminal. That is, the user may enable the image processing function in the system function option bar in the terminal. In an implementation, the image processing function may alternatively be added as an independent APP to the terminal. That is, the user may enable the image processing function by opening the APP.

Figure 1B:
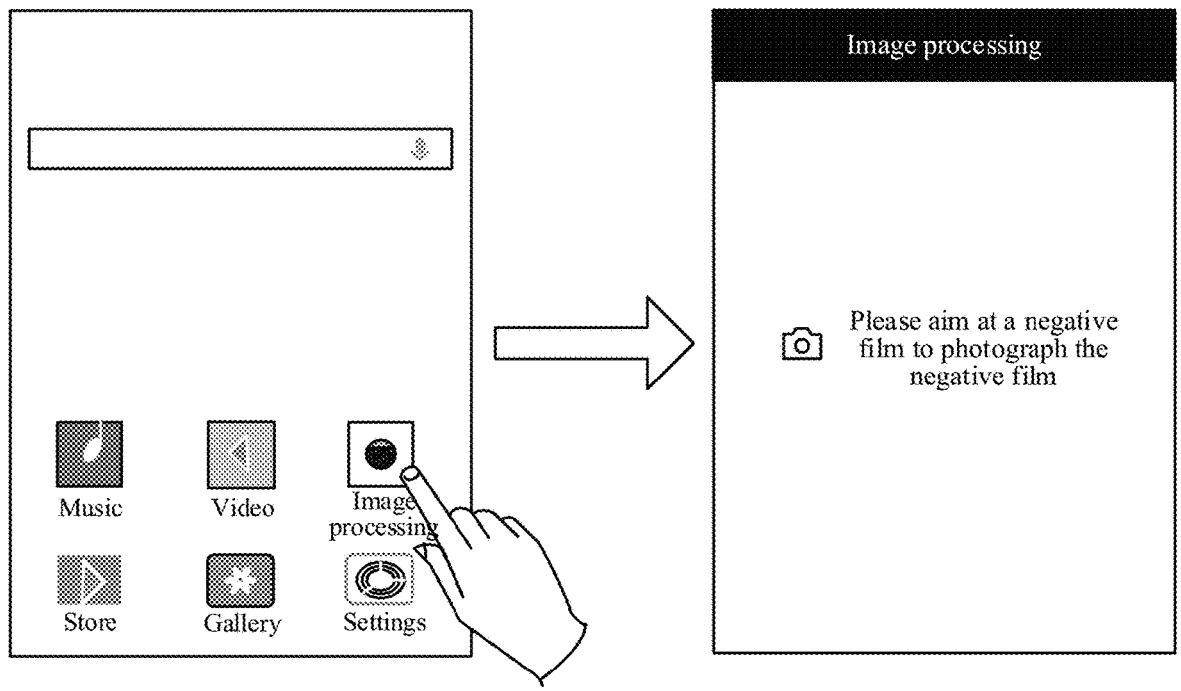
FIG. 1B is a diagram of an application scenario of an image processing function according to an embodiment of this disclosure.
Figure 1C:
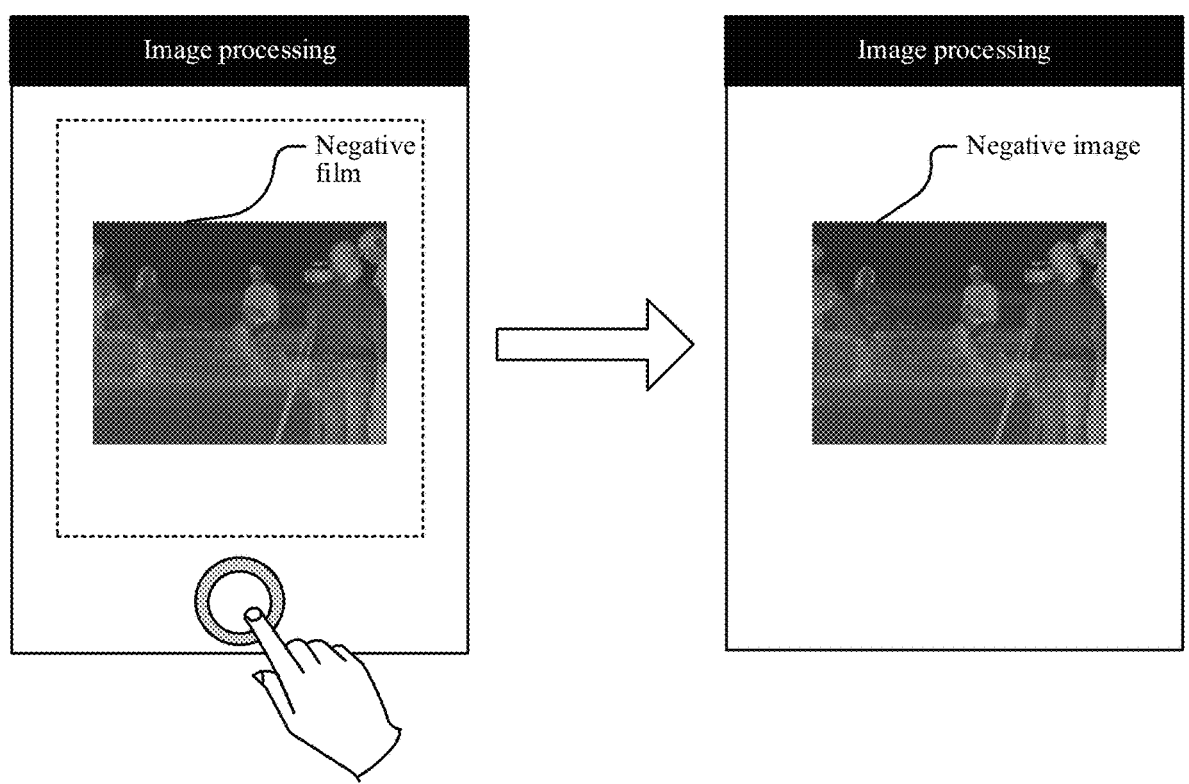
FIG. 1C is a diagram of an application scenario of an image processing function according to an embodiment of this disclosure.

The image processing function is described below by using an example in which the image processing function is added as an independent APP to a mobile terminal. When a user wants to convert a negative film into a digital image, the user may enable the image processing function in the mobile terminal. As shown in FIG. 1B, after detecting an operation of the user for enabling the image processing function, the mobile terminal may enable and run the image processing function, and output prompt information on a user interface to prompt the user to capture an image of the negative. The user may photograph the negative film according to the prompt information. As shown in FIG. 1C, after detecting the photographing operation of the user, the mobile terminal may call a camera component of the mobile terminal to acquire an image of the negative film and use the acquired image as a negative image.

Figure 1D:
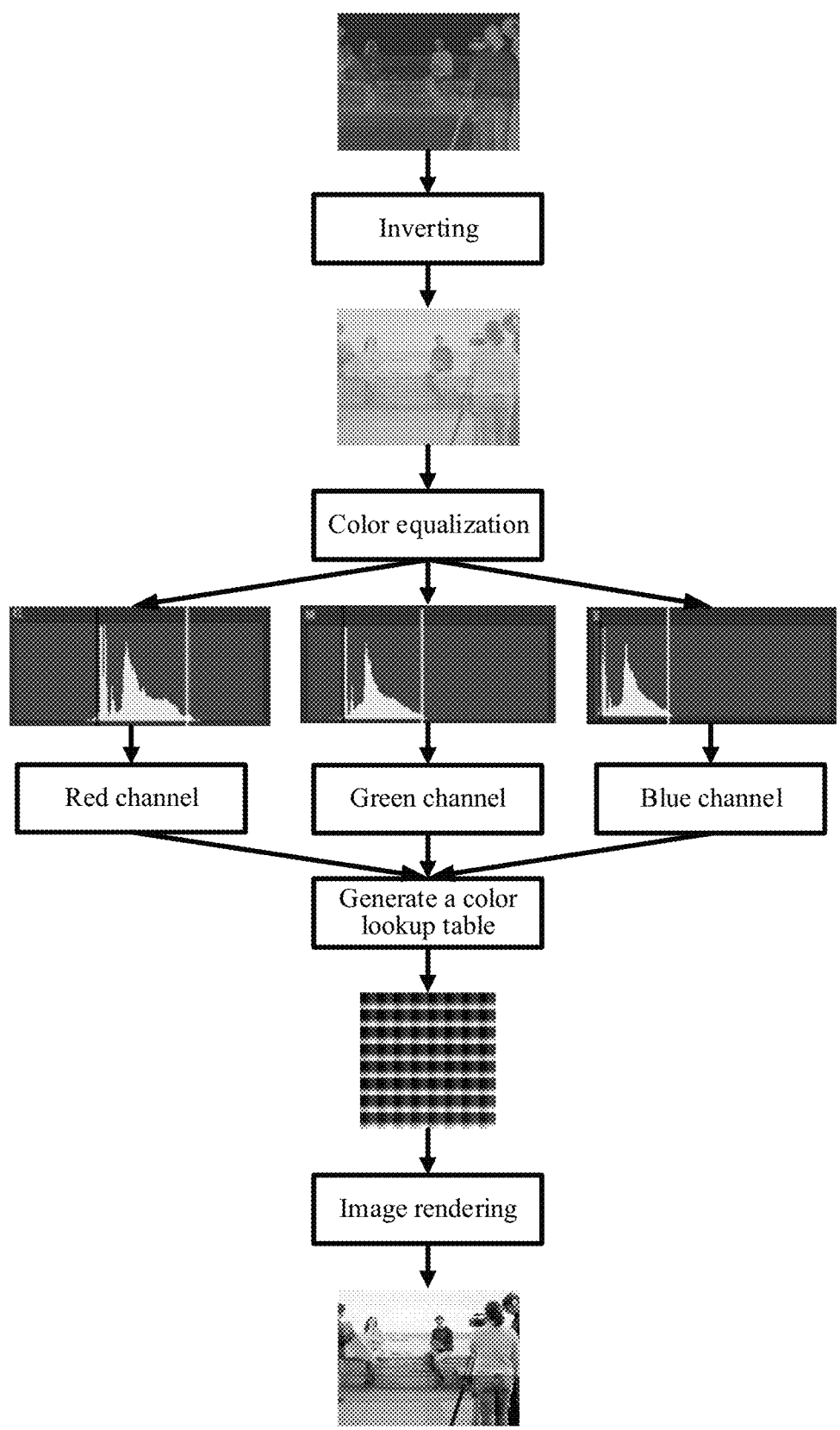
FIG. 1D is a schematic flowchart of image processing according to an embodiment of this disclosure.
Figure 1E:
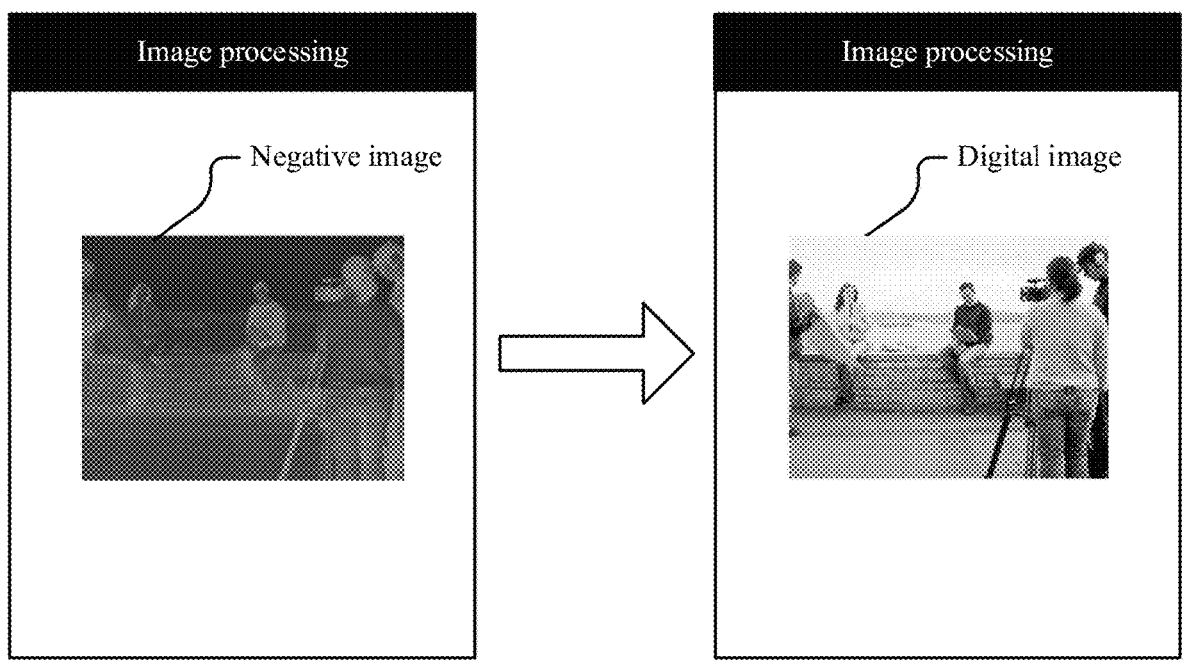
FIG. 1E is a diagram of an application scenario of an image processing function according to an embodiment of this disclosure.

After acquiring the negative image, the mobile terminal may perform a series of image processing on the negative image to restore digital image data of the negative image, so as to convert the negative image into a digital image. Reference may also be made to FIG. 1D for a specific process of the image processing. Specifically, the mobile terminal may first invert the negative image to obtain inverted image data. The inverted image data may include inverted color values of pixels, and an inverted color value of each pixel include inverted component values of the pixel in color channels in an RGB (optical three primary colors) color space. After the inverted image data is obtained, color equalization may be performed on the inverted image data to obtain digital color values of the pixels in color channels in the RGB color space. Specifically, value equalization may be performed on color values of the pixels according to pixel distribution maps of the inverted image data in the color channels in the RGB color space, to obtain the digital color values of the pixels in the color channels in the RGB color space. Then, a color lookup table may be generated according to the digital color values of the pixels in the color channels in the RGB color space. The color lookup table includes correspondences between the inverted color values of the pixels and digital colors. Finally, image rendering may be performed based on the color lookup table to obtain the digital image corresponding to the negative image. As shown in FIG. 1E, after obtaining the digital image of the negative image, the mobile terminal may further output the digital image on the user interface for the user to view.

In view of this, the image processing function provided by this embodiment of this disclosure enables the user to digitalize a negative on the terminal, so that a complex process procedure of using a darkroom development technology to develop the negative can be avoided. For any negative film such as a negative preserved by parents or other elders in the past or a negative film captured by a film enthusiast at present, even a user without any experience in the darkroom development technology can convert the negative film into a digital image easily and conveniently by using the image processing function, and display, store, and spread the digitally developed image by using a terminal, thereby omitting a process of taking the negative film to an image development store and waiting for the development, so that image memory stored by the negative can be restored portably.

Figure 2A:
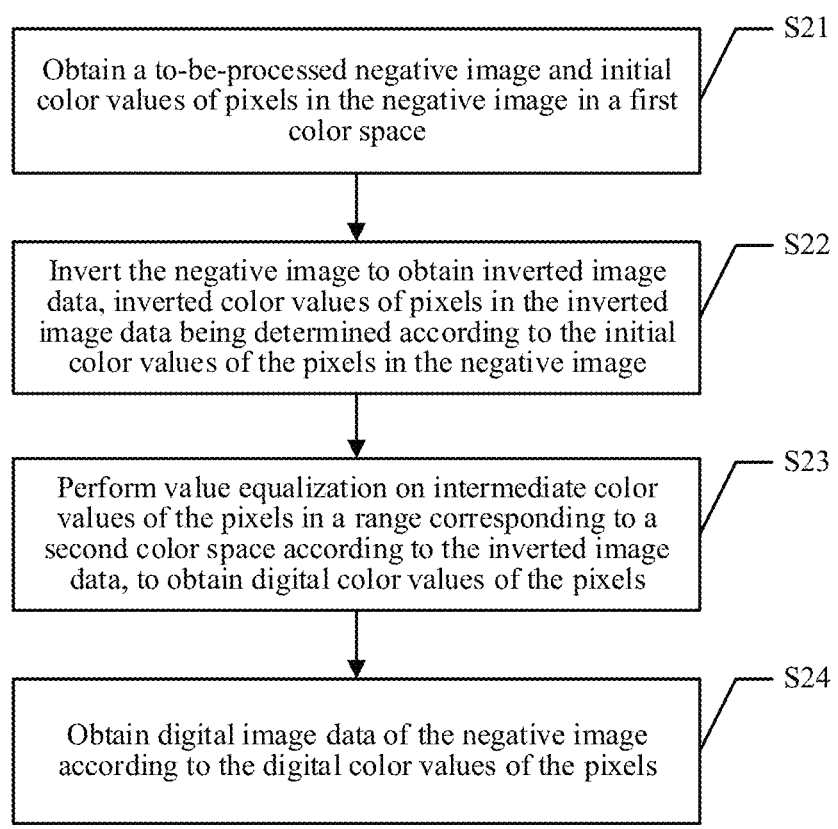
FIG. 2A is a schematic flowchart of an image processing method according to an embodiment of this disclosure.

Based on the related descriptions of the image processing function above, FIG. 2A is a schematic flowchart of an image processing method according to an embodiment of this disclosure. The image processing method may be implemented by using the terminal mentioned above. As shown in FIG. 2A, the image processing method includes the following steps S21 to S24.

Step S21: Obtain a to-be-processed negative image and initial color values of pixels in the negative image in a first color space.

Step S22: Invert the negative image to obtain inverted image data, inverted color values of pixels in the inverted image data being determined according to the initial color values of the pixels in the negative image.

In some embodiments, reference may be made to steps S201 and S202 or steps S401 and S402 in this embodiment of this disclosure for specific implementations of steps S21 to S22, and detail are not described herein again.

Step S23: Perform value equalization on intermediate color values of the pixels in a range corresponding to a second color space according to the inverted image data to obtain digital color values of the pixels.

In some embodiments, reference may be made to step S203 in this embodiment of this disclosure for a specific implementation of step S23, and details are not described herein again.

Step S24: Obtain digital image data of the negative image according to the digital color values of the pixels.

In some embodiments, reference may be made to step S204 in this embodiment of this disclosure for a specific implementation of step S24, and details are not described herein again.

In some embodiments, in a case that the first color space is the same as the second color space and is a target color space, the intermediate color values include the inverted color values.

In some embodiments, in a case that the first color space is different from the second color space, the intermediate color values include converted color values obtained by converting the inverted color values.

In some embodiments, the converting the inverted color values includes: converting the inverted color values of the pixels in the inverted image data from the first color space to the second color space to obtain converted color values of the pixels.

In some embodiments, performing value equalization on intermediate color values of the pixels in a range corresponding to a second color space to obtain digital color values of the pixels includes: performing value equalization on the converted color values of the pixels in the range corresponding to the second color space, to obtain equalized color values of the pixels; and converting the equalized color values of the pixels from the second color space to the first color space to obtain the digital color values of the pixels.

Figure 2B:
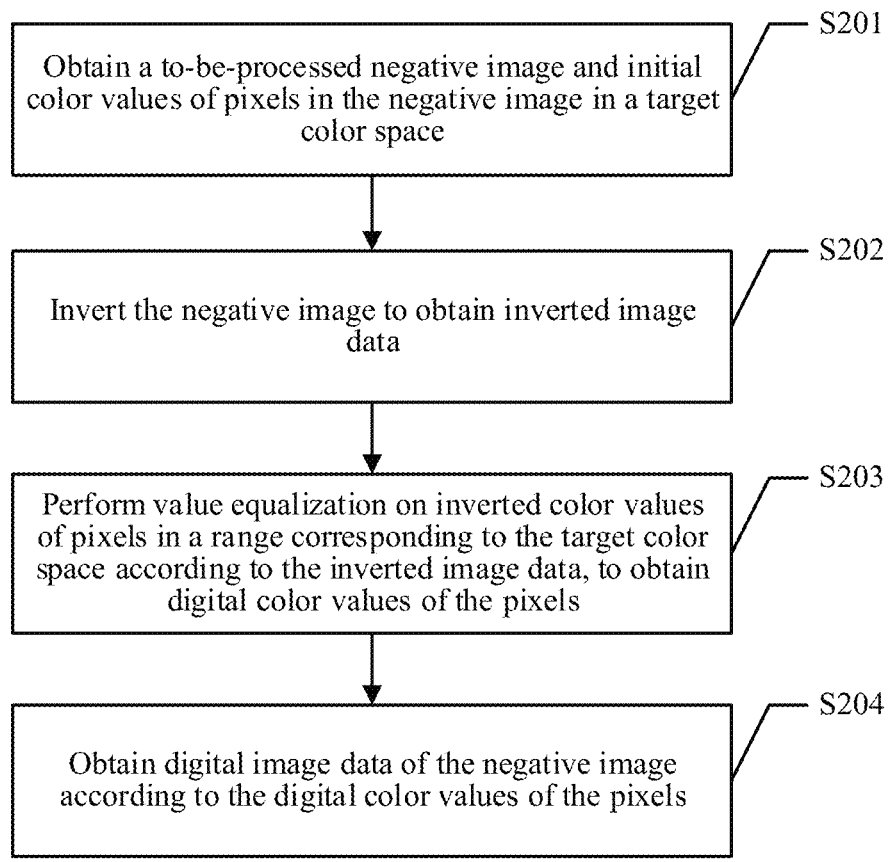
FIG. 2B is a schematic flowchart of an image processing method according to an embodiment of this disclosure.

As described above, in a case that the first color space is the same as the second color space and is a target color space, the intermediate color values include the inverted color values. The embodiments of this disclosure provide an image processing method. FIG. 2B is a schematic flowchart of an image processing method according to an embodiment of this disclosure. The image processing method may be implemented by using the terminal mentioned above. As shown in FIG. 2B, the image processing method includes the following steps S201 to S204.

Step S201: Obtain a to-be-processed negative image and initial color values of pixels in the negative image in a target color space.

Specifically, when detecting an image capture instruction from a user for a negative film, the terminal may, in response to the image capture instruction, call a camera component to photograph the negative film to obtain the to-be-processed negative image. After obtaining the negative image, the terminal may recognize pixels in the negative image to obtain initial color values of the pixels in the target color space. In an implementation, the target color space may include an RGB color space, and the initial color values may be initial RGB values. The initial color values may include initial component values of the pixels in color channels in the target color space. That is, an initial RGB value of a pixel may include an initial R value, an initial G value, and an initial B value.

Step S202: Invert the negative image to obtain inverted image data according to the initial color values of the pixels in the negative image.

Based on the above, it can be learned that, a negative film is a film that records, during imaging, colors opposite to true colors of a photographed object, and therefore, initial color values of pixels in a negative image obtained by photographing a negative film are used for reflecting colors opposite to true colors of the pixels. Therefore, after an inverted image is obtained, the negative image may be inverted to obtain inverted image data, so that inverted color values of the pixels in the inverted image data can be used for reflecting true colors of the pixels. The inverted color values may be inverted RGB values. The inverted color values of the pixels are determined according to the initial color values of the pixels in the negative image. The inverting refers to calculating complementary values of the initial color values of the pixels in the negative image and using the complementary values of the pixels as the inverted color values of the pixels. The initial color values include initial component values of the pixels in color channels in the target color space. Therefore, in a specific implementation process of step S202, the terminal may invert the initial component values of the pixels in the negative image in color channels in the target color space to obtain inverted component values of the pixels in the color channels in the target color space and form the inverted color values of the pixels by using the inverted component values of the pixels to obtain the inverted image data.

Step S203: Perform value equalization on inverted color values of pixels in a range corresponding to the target color space according to the inverted image data to obtain digital color values of the pixels.

Figure 3A:
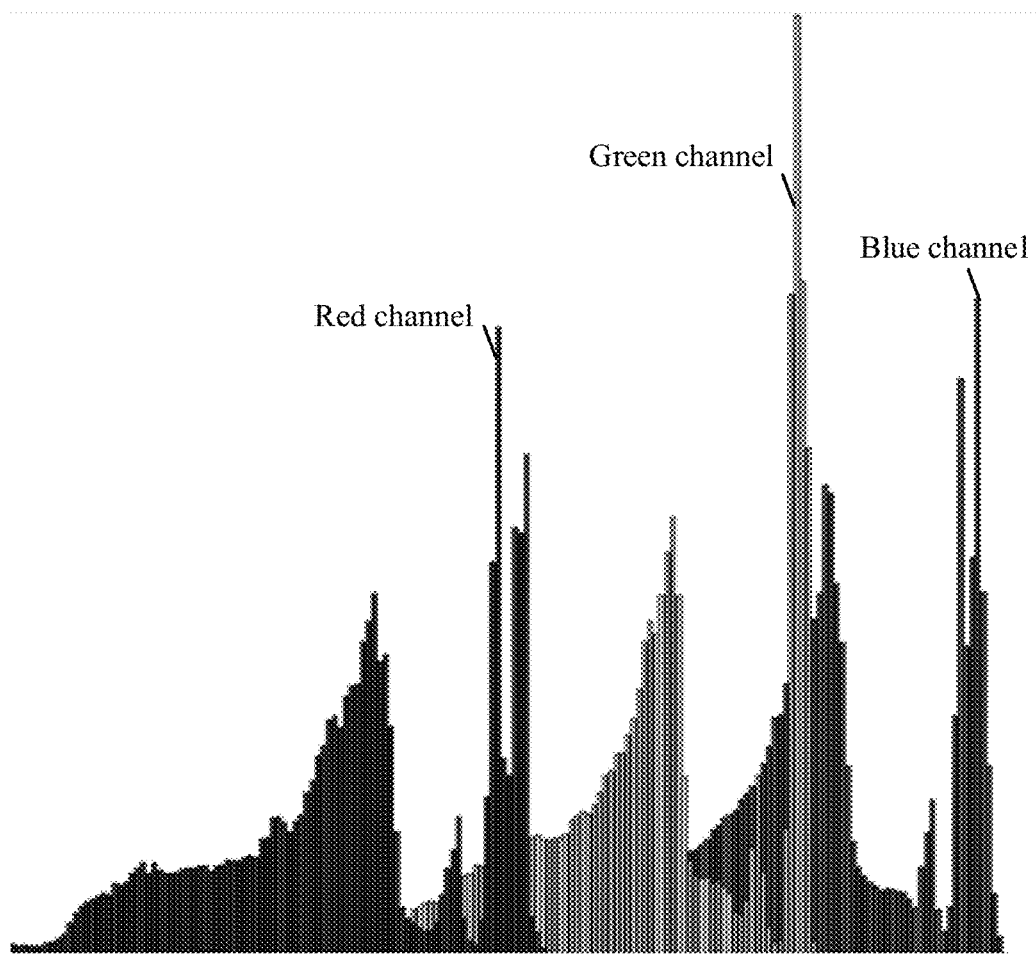
FIG. 3A is a schematic diagram of a color histogram according to an embodiment of this disclosure.
Figure 3B:
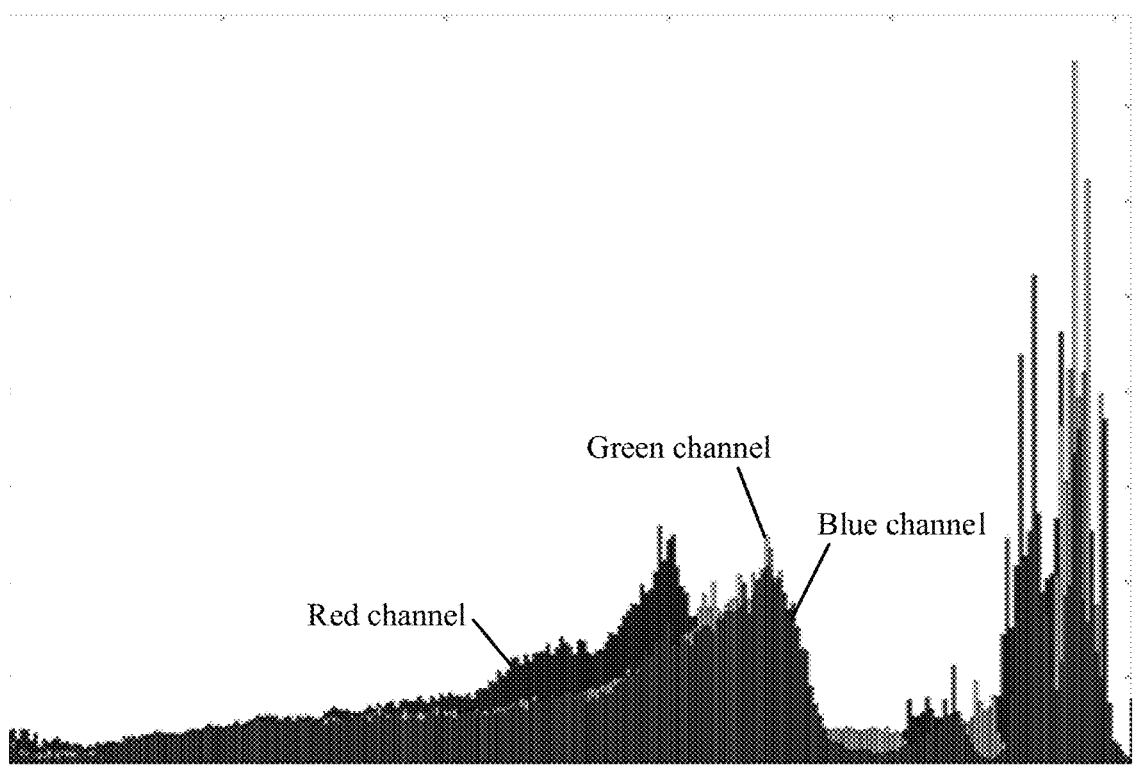
FIG. 3B is a schematic diagram of another color histogram according to an embodiment of this disclosure.

Studies have shown that, a film substrate of a negative film is generally coated with a specific chemical substance (for example, a color mask) to prevent bad light from being reflected back after light enters a photosensitive layer and reaches the film substrate. However, the chemical substance may interfere with colors. As a result, an inverted image corresponding to inverted image data obtained through inverting may have an obvious color cast phenomenon visually. According to color histogram distribution of the inverted image data in an RGB color space shown in FIG. 3A, a color cast phenomenon can be more intuitively observed. That is, color histograms corresponding to three channels, that is, an R channel (red channel), a G channel (green channel), and a B channel (blue channel) are almost staggered from each other. Therefore, to coordinate the distribution of the color histograms corresponding to the three channels, that is, the R channel, the G channel, and the B channel (as shown in FIG. 3B) to resolve the color cast problem, in this embodiment of this disclosure, color equalization may be performed on an inverted image corresponding to the inverted image data.

Specifically, the terminal may perform value equalization on the inverted color values of the pixels in a range corresponding to the target color space according to the inverted image data to obtain the digital color values of the pixels. The range corresponding to the target color space may include ranges of color channels in the target color space. A range of a color channel is a value range of color values of pixels in the color channel. For example, if the target color space is an RGB color space, a range corresponding to the target color space includes a range of the R channel, a range of the G channel, and a range of the B channel. Using the R channel as an example, a value range of color values of pixels in the R channel is 0 to 255, and therefore, the range of the R channel is [0, 255].

In an implementation, a specific implementation of step S203 may be as follows: first determining a set of local ranges formed by a maximum inverted color value and a minimum inverted color value in the inverted image data, the set of local ranges including local ranges formed by minimum inverted component values and maximum inverted component values in color channels in the target color space; then, performing value equalization on the inverted color values of the pixels in a range corresponding to the target color space according to the set of local ranges to obtain the digital color values of the pixels. Specifically, a target local range formed by a minimum inverted component value and a maximum inverted component value in the target color channel may be obtained from the set of local ranges, and the target color channel is any channel in the target color space. A ratio of the range of the target color channel to the target local range is calculated to obtain a proportion mapping parameter. For example, if the range of the target color channel is set to [0, 255], and a value range formed by the minimum inverted component value and the maximum inverted component value in the target color channel is [5, 56], the proportion mapping parameter is: (255−0)/(56−5)=5. The inverted component values of the pixels in the target color channel are calculated by using the proportion mapping parameter to obtain the digital component values of the pixels in the target color channel. Specifically, the inverted component values of the pixels in the target color channel may be substituted into formula 1.1 for calculation, to obtain the digital component values of the pixels in the target color channel.

$$F(x) = (x - A_1) \times Q \qquad \text{Formula 1.1}$$

where x represents an inverted component value of a target pixel in the target color channel, $A_1$ represents the minimum inverted component value in the target color channel, Q represents the proportion mapping parameter value, and F(x) represents a digital component value of the target pixel in the target color channel. After the digital component values of the pixels in the target color channel are obtained, digital color values of the pixels can be obtained according to the digital component values of the pixels in the target color channel.

In an implementation, the specific implementation of step S203 may alternatively be as follows: first obtaining a pixel distribution map of the inverted image data in the target color space. The pixel distribution map may include, but is not limited to, a color histogram, a color curve graph, and the like. Then, value equalization is performed on the inverted color values of the pixels in a range corresponding to the target color space according to the pixel distribution map to obtain the digital color values of the pixels. The digital color values of the pixels may be digital RGB values.

Step S204: Obtain digital image data of the negative image according to the digital color values of the pixels.

After obtaining the digital color values of the pixels, the terminal may obtain the digital image data of the negative image according to the digital color values of the pixels in step S204. In an implementation, the terminal may directly use the digital color values of the pixels as the digital image data of the negative image, so that rendering may be subsequently performed directly according to the digital color values of the pixels, to obtain the digital image corresponding to the negative image. In an implementation, the terminal may establish a color lookup table of the inverted image data according to the digital color values of the pixels, and use the inverted image data and the color lookup table as the digital image data of the negative image, so that colors corresponding to the inverted color values of the pixels in the inverted image data can be found according to the color lookup table, to perform rendering to obtain the digital image corresponding to the negative image.

In this embodiment of this disclosure, because the negative records colors opposite to true colors, after the initial color values of the pixels in the negative image in the target color space are obtained, the negative image may be first inverted to obtain inverted image data. The inverted image data includes the inverted color values of the pixels. Then value equalization may be performed on the inverted color values of the pixels in a range corresponding to the target color space according to the inverted image data, so that the digital color values of the pixels obtained through the value equalization can more accurately reflect true colors, thereby improving the accuracy of the digital image data of the negative image obtained according to the digital color values. It can be learned from the foregoing image processing procedure that, in this embodiment of this disclosure, it is unnecessary to develop a negative by using a complex darkroom developing technology, and it is also unnecessary to train a model by using a large quantity of negative images, thereby reducing the complexity of image processing to some extent, and improving the feasibility of the image processing.

Figure 4A:
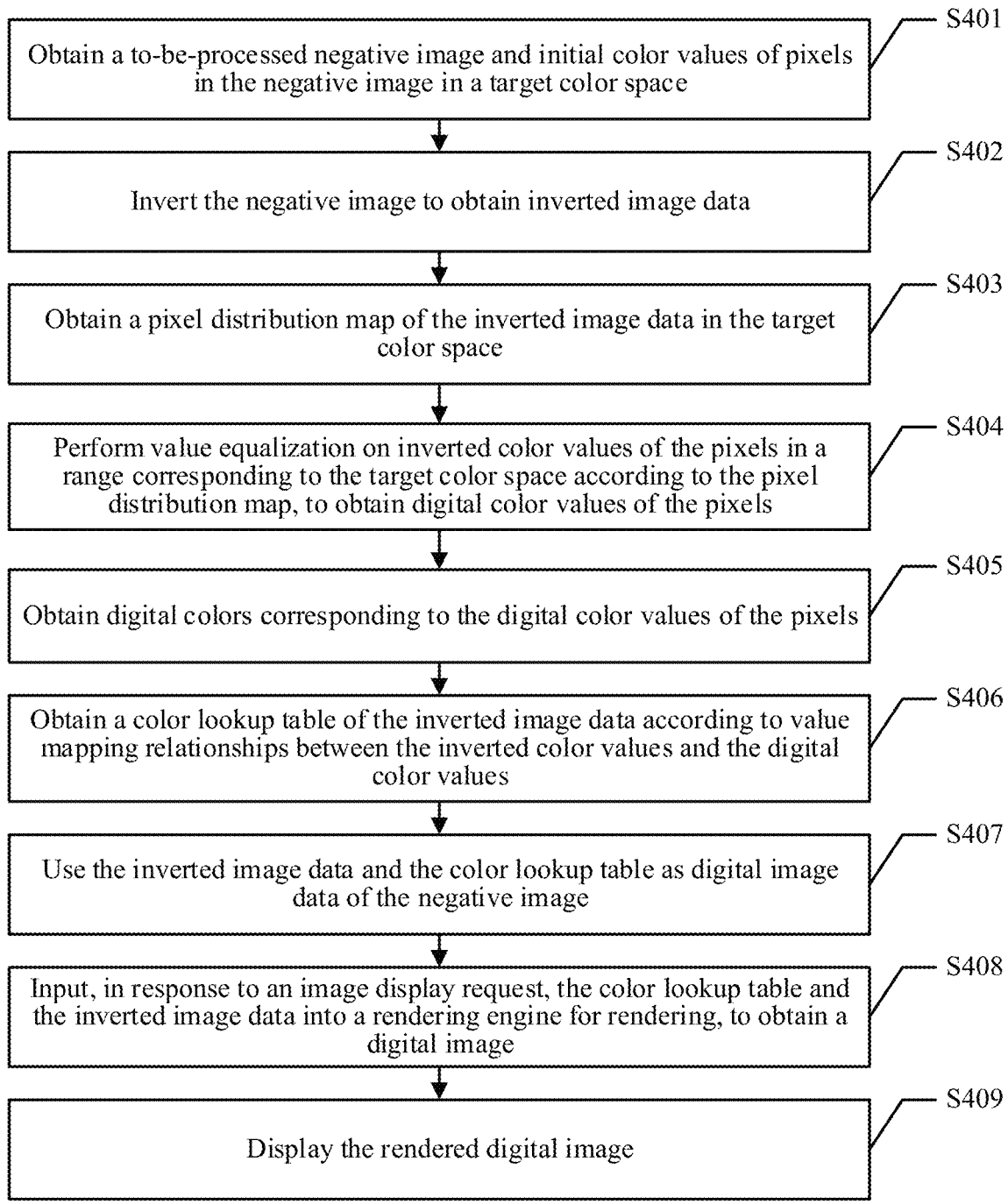
FIG. 4A is a schematic flowchart of an image processing method according to another embodiment of this disclosure.

The embodiments of this disclosure further provide another image processing method. The image processing method may be implemented by using the terminal mentioned above. FIG. 4A is a schematic flowchart of an image processing method according to another embodiment of this disclosure. As shown in FIG. 4A, the image processing method includes the following steps S401 to S409.

This embodiment of this disclosure is described mainly by using an example in which a target color space is an RGB color space. For a specific implementation when the target color space is another color space, reference may be made to this embodiment of this disclosure.

Step S401: Obtain a to-be-processed negative image and initial color values of pixels in the negative image in a target color space.

Step S402: Invert the negative image to obtain inverted image data, inverted color values of pixels in the inverted image data being determined according to the initial color values of the pixels in the negative image.

Figure 4B:
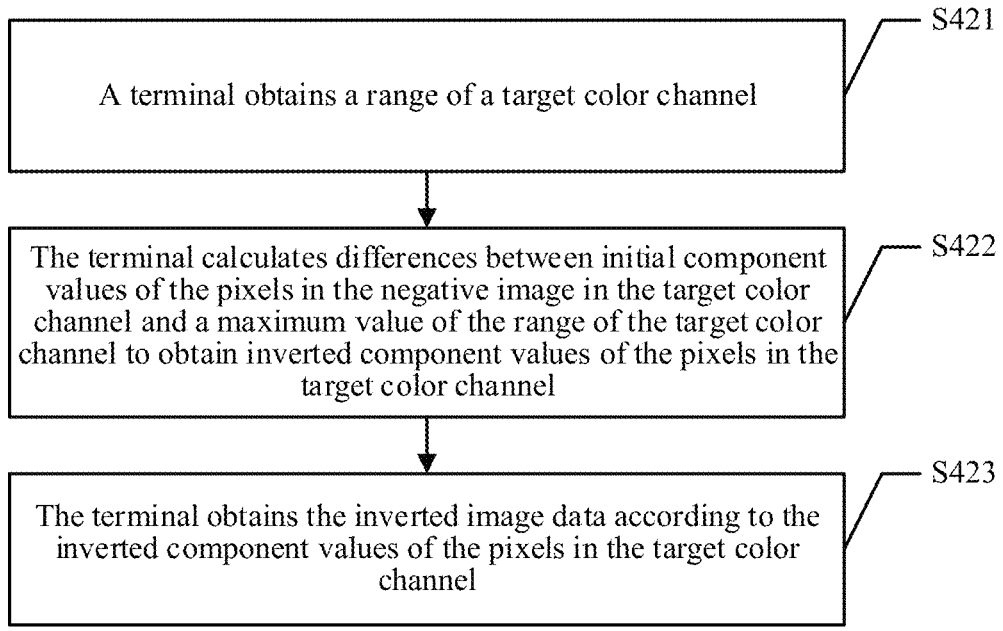
FIG. 4B is a specific flowchart of inverting a negative image to obtain inverted image data according to an embodiment of this disclosure.

Based on the above, it can be learned that, the initial color values include initial component values of the pixels in color channels in the target color space. Correspondingly, a specific implementation of step S402 may be as shown in FIG. 4B. FIG. 4B is a specific flowchart of inverting a negative image to obtain inverted image data according to an embodiment of this disclosure. As shown in FIG. 4B, the specific flowchart includes the following steps S421 to S423.

Step S421: A terminal obtains a range of a target color channel, the target color channel being any channel in the target color space.

Step S422: The terminal calculates differences between the initial component values of the pixels in the negative image in the target color channel and a maximum value of the range of the target color channel to obtain inverted component values of the pixels in the target color channel. For example, the maximum value of the range of the target color channel is 255, and then the inverted component value=255−initial component value.

Step S423: The terminal obtains the inverted image data according to the inverted component values of the pixels in the target color channel.

Specifically, the inverted component values of the pixels in color channels in the target color space may be calculated by using the foregoing method, so as to obtain the inverted color values of the pixels in the target color space. The inverted color values include the inverted component values of the pixels in color channels in the target color space. The inverted color values of the pixels in the target color space are added to the inverted image data.

Step S403: Obtain a pixel distribution map of the inverted image data in the target color space. The pixel distribution map includes pixel distribution maps of the inverted image data in color channels in the target color space, and the target color space includes an RGB color space.

Specifically, after the inverted image data is obtained, any color channel may be selected from the target color space as the target color channel, and the inverted component values of the pixels in the inverted image data in the target color channel is obtained. The pixels are arranged in ascending order of the inverted component values of the pixels in the target color channel, to obtain a pixel distribution map of the inverted image data in the target color channel.

Step S404: Perform value equalization on the inverted color values of the pixels in a range corresponding to the target color space according to the pixel distribution map to obtain digital color values of the pixels after the pixel distribution map of the inverted image data in the target color space is obtained.

Figure 4C:
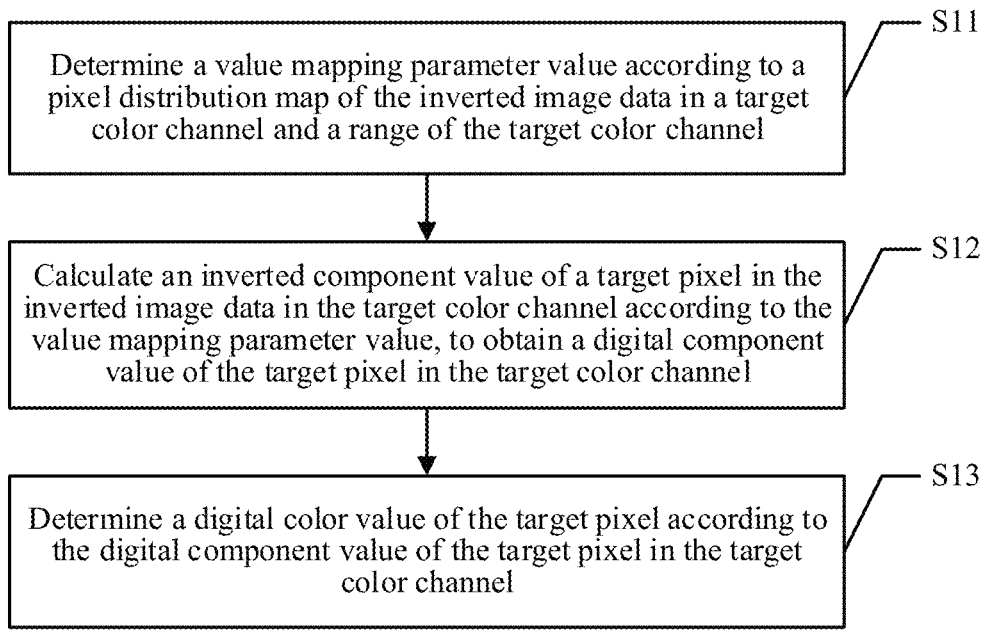
FIG. 4C is a specific flowchart of step S404 according to an embodiment of this disclosure.

FIG. 4C is a specific flowchart of step S404 in this embodiment of this disclosure. As shown in FIG. 4C, step S404 includes the following steps S11 to S13.

S11: Determine a value mapping parameter according to a pixel distribution map of the inverted image data in a target color channel and a range of the target color channel.

Figure 5A:
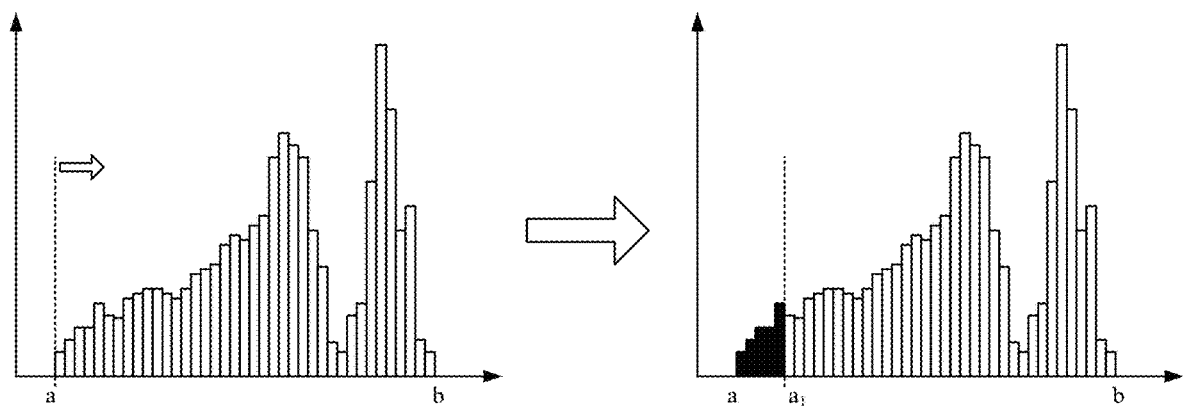
FIG. 5A is a schematic diagram of determining a first inverted component value according to an embodiment of this disclosure.

The target color channel is any one of the following channels: R channel, G channel, or B channel. The pixel distribution map in the target color channel may be a color histogram. A horizontal axis of the color histogram represents an inverted component value, and a vertical axis represents a frequency of the inverted component value (that is, a quantity of pixels corresponding to the inverted component value). In a specific implementation process, the terminal may first determine a total area of the color histogram of the inverted image data in the target color channel. Specifically, an area of each column in the color histogram may be determined by using a formula for calculating an area of a rectangle, and a sum of areas of columns is obtained as the total area of the color histogram. Alternatively, the total area of the color histogram may be obtained through an integral operation performed according to a minimum inverted component value and a maximum inverted component value of the color histogram. Second, a first inverted component value and a second inverted component value may be determined from the inverted component values of the pixels in the target color channel based on the total area. In an implementation, reference may be made to FIG. 5A for a specific implementation of determining the first inverted component value from the inverted component values of the pixels in the target color channel based on the total area. A vertical line may be set at the left side (that is, at the minimum inverted component value a) of a color histogram corresponding to the target color channel, and the vertical line is gradually slid from left to right. If a ratio of a local area to the total area meets a proportion condition, the sliding of the vertical line is stopped, and the inverted component value corresponding to the current position of the vertical line is used as a first inverted component value $a_1$. The local area is determined according to an inverted component value corresponding to a current position of the vertical line and the minimum inverted component value. That is, a ratio of the local area (an area of a black region shown in FIG. 5A determined by the first inverted component value and the minimum inverted component value) to the total area meets the proportion condition.

Figure 5B:
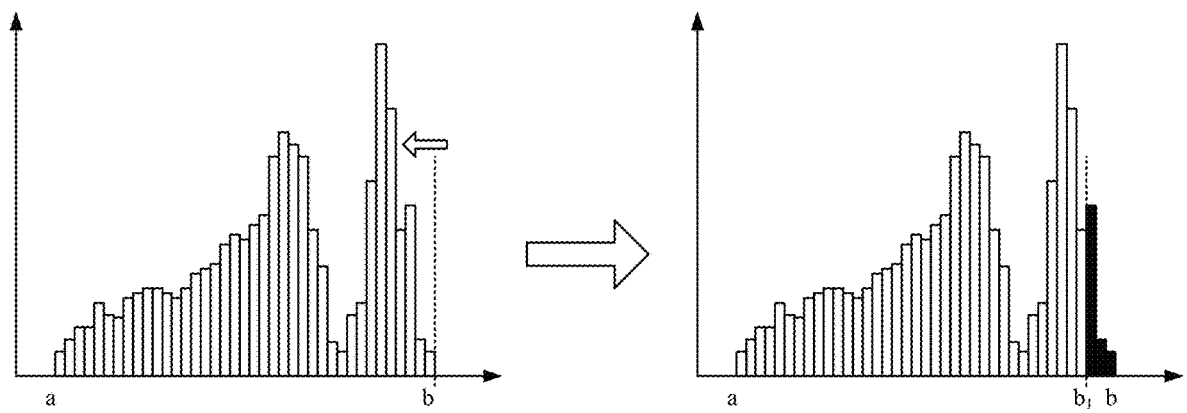
FIG. 5B is a schematic diagram of determining a second inverted component value according to an embodiment of this disclosure.

Similarly, in an implementation, reference may be made to FIG. 5B for a specific implementation of determining the second inverted component value from the inverted component values of the pixels in the target color channel based on the total area. A vertical line may be set at the right side (that is, at the maximum inverted component value b) of the color histogram corresponding to the target color channel, and the vertical line is gradually slid from right to left. If a ratio of a local area to the total area meets a proportion condition, the sliding of the vertical line is stopped, and the inverted component value corresponding to the current position of the vertical line is used as a second inverted component value $b_1$. The local area is determined according to an inverted component value corresponding to a current position of the vertical line and the maximum inverted component value. That is, a ratio of the local area (an area of a black region shown in FIG. 5B determined by the second inverted component value and the maximum inverted component value) to the total area meets the proportion condition. The proportion condition mentioned above may include a condition that a ratio of a local area to a total area is equal to a proportion threshold. The proportion threshold, for example, may be set to 1% according to an empirical value or a service requirement. If a ratio of an area of a column corresponding to the minimum inverted component value (that is, the first column from left to right) to the total area is greater than or equal to the proportion threshold, the minimum inverted component value may be determined as the first inverted component value. If a ratio of an area of a column corresponding to the maximum inverted component value (that is, the first column from right to left) to the total area is greater than or equal to the proportion threshold, the maximum inverted component value may be determined as the second inverted component value.

After the first inverted component value and the second inverted component value are determined, the value mapping parameter may be calculated according to a value range formed by the first inverted component value and the second inverted component value and the range of the target color channel. Specifically, the terminal may calculate a ratio of the range of the target color channel to the value range and use the calculated ratio as the value mapping parameter. For example, if the range of the target color channel is set to [0, 255], and the value range formed by the first inverted component value and the second inverted component value is [5, 92], the value mapping parameter equals: (255−0)/(92−5)=3.

S12: Calculate an inverted component value of a target pixel in the inverted image data in the target color channel according to the value mapping parameter to obtain a digital component value of the target pixel in the target color channel.

The target pixel includes a pixel with an inverted component value not less than the first inverted component value and not greater than the second inverted component value in the target color channel. That is, the inverted component value of the target pixel is not less than the first inverted component value and not greater than the second inverted component value. In a specific implementation process, the inverted component value of the target pixel in the inverted image data in the target color channel may be calculated according to the value mapping parameter by calling a value mapping algorithm to obtain the digital component value of the target pixel in the target color channel. The value mapping algorithm is a mapping algorithm based on an interpolation calculation. Reference may be made to formula 1.2 for a specific algorithm.

$$f(x) = (x - a_1) \times q + a \qquad \text{Formula 1.2}$$

where x represents the inverted component value of the target pixel in the target color channel, $a_1$ represents the first inverted component value, q represents the value mapping parameter, a represents a minimum value of the range of the target color channel, and f(x) represents the digital component value of the target pixel in the target color channel. Referring to an example in step S11, if the range of the target color channel is [0, 255], and the value range formed by the first inverted component value and the second inverted component value is [5, 92], then the value mapping parameter q is equal to 3. If the inverted component value of the target pixel in the target color channel is 6, the digital component value of the target pixel in the target color channel that can be calculated by using formula 1.1 is: (6−5)×3+0=3.

When a first pixel with an inverted component value in the target color channel less than the first inverted component value exists, a digital component value of the first pixel in the target color channel is set to the minimum value of the range of the target color channel. When a second pixel with an inverted component value in the target color channel greater than the second inverted component value exists, a digital component value of the second pixel in the target color channel is set to the maximum value of the range of the target color channel. In the foregoing example, the range of the target color channel is [0, 255]. If an inverted component value of a pixel 1 in the target color channel is 4, less than the first inverted component value (i.e., 5), the pixel 1 is the first pixel, and a digital component value of the pixel 1 in the target color channel may be set to 0. If an inverted component value of a pixel 2 in the target color channel is 95, greater than the second inverted component value (i.e., 92), the pixel 2 is the second pixel, and a digital component value of the pixel 2 in the target color channel may be set to 255.

S13: Determine a digital color value of the target pixel according to the digital component value of the target pixel in the target color channel.

The terminal may add the digital component value of the target pixel in the target color channel to the digital color value of the target pixel. Digital component values of the target pixel in color channels in the target color space may also be calculated through the foregoing steps S11 and S12. A digital color value of the target pixel is formed by using the digital component values of the target pixel in color channels.

Step S405: The terminal obtains digital colors corresponding to digital color values of the pixels after obtaining the digital color values of the pixels.

Step S406: Obtain a color lookup table of the inverted image data according to value mapping relationships between the inverted color values of the pixels and the digital color values, the color lookup table including correspondences between the inverted color values of the pixels in the inverted image data and the digital colors.

Specifically, the terminal may first obtain the value mapping relationships between the inverted color values of the pixels and the digital color values. A pixel corresponding to an inverted color value having a value mapping relationship with a digital color value and a pixel corresponding to the digital color value are the same pixel. Secondly, correspondences between the inverted color values of the pixels and digital colors corresponding to digital color values having a mapping relationship with the inverted color values may be determined according to the value mapping relationships between the inverted color values of the pixels and the digital color values. For example, if an inverted color value of a pixel a is (128, 128, 128), and a digital color value is (255, 255, 255), a value mapping relationship of the pixel a is (128, 128, 128)→(255, 255, 255). A digital color corresponding to (255, 255, 255) is white, and since the inverted color value of the pixel a and the white digital color have a correspondence, the correspondence is (255, 255, 255)→white.

After the correspondences between the inverted color values of the pixels and the digital colors are obtained, a color lookup table may be constructed by using the correspondences between the inverted color values of the pixels and the digital colors. The color lookup table may be presented in the form of a table or may be presented in the form of a two-dimensional image. When the color lookup table is presented in the form of a two-dimensional image, the two-dimensional image may be a lookup table (LUT). The LUT is a 512*512 image, and the LUT may include 8*8 large square grids. Each large square grid may include 64*64 small squares. In this embodiment of this disclosure, R inverted component values and G inverted component values of the pixels may be stored by using 64*64 small squares. The horizontal axis of each large square grid may be represented by an R channel value, and the vertical axis may be represented by a G channel value. Alternatively, the horizontal axis of each large square grid may be represented by the G channel value, and the vertical axis may be represented by the R channel value. For ease of description, this embodiment of this disclosure is subsequently described by using an example in which the horizontal axis is represented by the R channel value and the vertical axis is represented by the G channel value. A range of an R channel is [0, 255], including a total of 256 values. Therefore, a width value of each small square is 256/64=4, and a set of R channel values is [0, 4, 8, 12, 16, . . . , 255]. Similarly, a height value of each small square is also 256/64=4, and a set of G channel values is also [0, 4, 8, 12, 16, . . . , 255].

Different from the R channel values and the G channel values, in this embodiment of this disclosure, B inverted component values may be stored by using 8*8 large squares. A range of a B channel is also [0, 255]. Therefore, each large square stores four B inverted component values. That is, B inverted component values stored by the first large square are [0, 4), B inverted component values stored by the second large square are [4, 8), and so on. The B inverted component values may be stored by using a row-major order principle or may be stored by using a column-major order principle. The row-major order principle is a principle that large squares in the same row are preferentially used to store the B inverted component values. That is, the first large square and the second large square are located in the same row. The column-major order principle is a principle that large squares in the same column are preferentially used to store the B inverted component values. That is, the first large square and the second large square are located in the same column. How to construct a color lookup table (such as an LUT) by using the correspondences between the inverted color values of the pixels and the digital colors is described in detail by using an example in which the B inverted component values are stored in the row-major order principle: If an inverted color value of a pixel b is (5, 5, 1), and a digital color value is (0, 0, 0), a correspondence between the inverted color value of the pixel b and the digital color is (5, 5, 1)→black. First, the first large square may be positioned according to a B inverted component value 1 of the pixel b. Second, a position indicated by (5, 5) in the first large square may be used as a color painting position of the pixel b, and the color painting position is painted in black.

Step S407: Use the inverted image data and the color lookup table as the digital image data of the negative image after the color lookup table is obtained.

Step S408: Input, in response to an image display request in a case that the image display request is received, the color lookup table and the inverted image data into a rendering engine for rendering, to obtain a digital image.

Specifically, a rendering engine such as GPUImageLookupFilter (a color lookup filter) may be selected randomly from GPUImage (an image rendering framework). The color lookup table and the inverted image data are inputted into the GPUImageLookupFilter for rendering to obtain the digital image. In this embodiment of this disclosure, the color lookup table and the inverted image data are inputted into the rendering engine together for rendering, so that the rendering engine may look up and render pixels concurrently, thereby improving the rendering efficiency.

Step S409: The terminal displays the rendered digital image after obtaining the digital image.

In this embodiment of this disclosure, because the negative records colors are opposite to true colors, after the initial color values of the pixels in the negative image in the target color space are obtained, the negative image may be first inverted to obtain inverted image data. The inverted image data includes the inverted color values of the pixels. Then value equalization may be performed on the inverted color values of the pixels in a range corresponding to the target color space according to the pixel distribution map of the inverted image data in the target color space, so that the digital color values of the pixels obtained through the value equalization can more accurately reflect true colors, thereby improving the accuracy of the digital image data of the negative image obtained according to the digital color values. It can be learned from the foregoing image processing procedure that, in this embodiment of this disclosure, it is unnecessary to develop a negative film by using a complex darkroom developing technology, and it is also unnecessary to train a model by using a large quantity of negative images, thereby reducing the complexity of image processing to some extent, and improving the feasibility of the image processing.

In an embodiment, a more precise local color equalization method may alternatively be used in this embodiment of this disclosure for color equalization on the inverted image, so as to achieve a better equalization effect. For example, in an HSV color space, an H channel (a hue channel) may be separated, and equalization is performed only for an S channel (a saturation channel) and a V channel (a brightness channel), so that the image can have better saturation continuity and brightness continuity.

Figure 6:
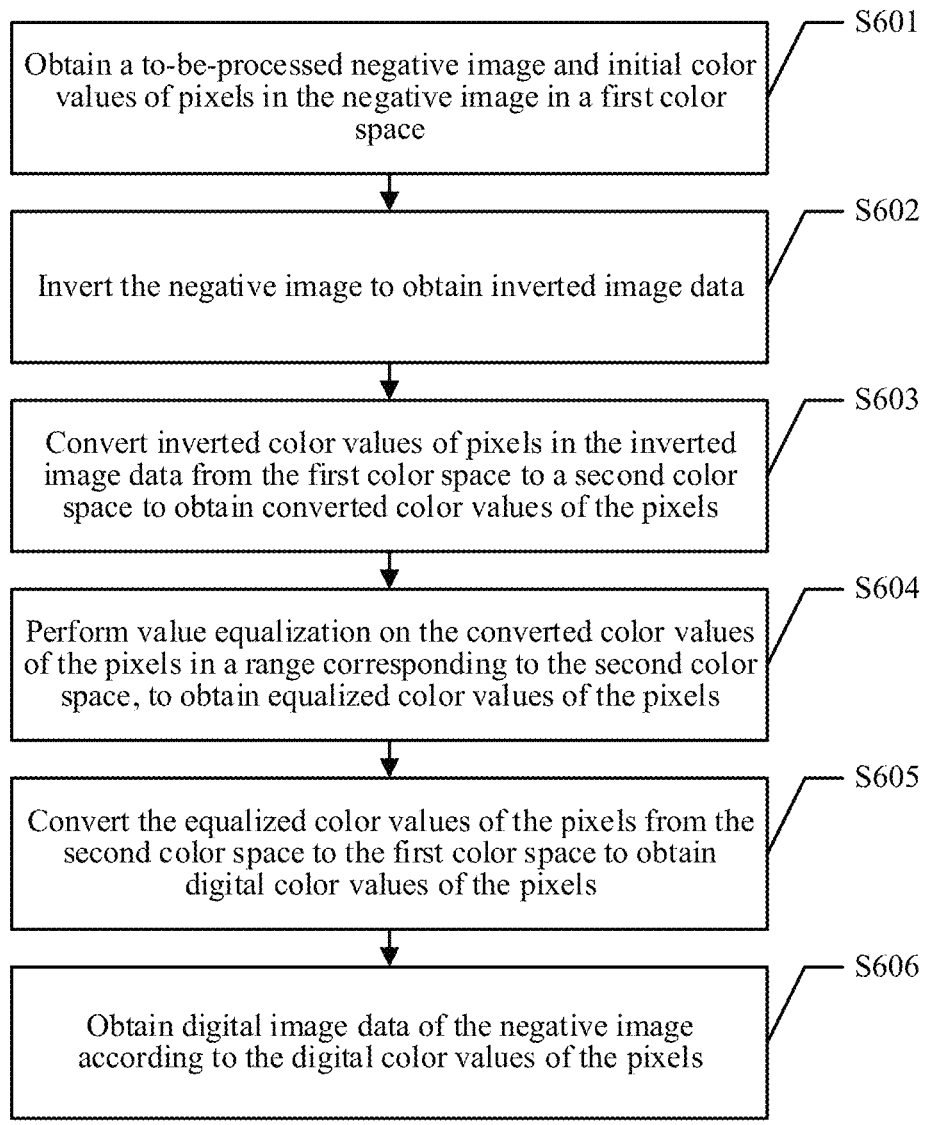
FIG. 6 is a schematic flowchart of an image processing method according to another embodiment of this disclosure.

Based on the above, the embodiments of this disclosure further provide another image processing method. The image processing method may be implemented by using the terminal mentioned above. FIG. 6 is a schematic flowchart of an image processing method according to another embodiment of this disclosure. As shown in FIG. 6, the image processing method includes the following steps S601 to S606.

Step S601: Obtain a to-be-processed negative image and initial color values of pixels in the negative image in a first color space.

Step S602: Invert the negative image to obtain inverted image data, inverted color values of pixels in the inverted image data being determined according to the initial color values of the pixels in the negative image.

For specific implementations of steps S601 and S602, reference may be made to steps S201 and S202 or steps S401 and S402 in the foregoing embodiments, and details are not described herein again.

Step S603: Convert the inverted color values of the pixels in the inverted image data from the first color space to a second color space after the inverted image data is obtained to obtain converted color values of the pixels. The first color space is an RGB color space, and the second color space is an HSV color space.

Step S604: Perform value equalization on the converted color values of the pixels in a range corresponding to the second color space to obtain equalized color values of the pixels. The range corresponding to the second color space may include ranges of color channels in the second color space.

In an implementation, a specific implementation of step S604 may be as follows: first determining a set of local ranges formed by a maximum converted color value and a minimum converted color value from the converted color values of the pixels, the set of local ranges including local ranges formed by minimum converted component values and maximum converted component values in the color channels in the second color space; then, performing value equalization on the converted color values of the pixels in the range corresponding to the second color space according to the set of local ranges to obtain the equalized color values of the pixels. Specifically, a target local range formed by a minimum converted component value and a maximum converted component value in a target color channel may be obtained from the set of local ranges, and the target color channel is an S channel or a V channel in the second color space. A ratio of a range of the target color channel to the target local range is calculated to obtain a proportion mapping parameter. The converted component values of the pixels in the target color channel are calculated by using the proportion mapping parameter to obtain equalized component values of the pixels in the target color channel. Equalized color values of the pixels are be obtained according to the equalized component values of the pixels in the target color channel. The range of the target color channel mentioned in this embodiment of this disclosure is [0, 1]. For a specific implementation process in this implementation, reference may be made to related descriptions of step S203 in the foregoing embodiments of this disclosure, and details are not described herein again.

In an implementation, the specific implementation of step S604 may also be as follows: First, a pixel distribution map of the inverted image data in the second color space is determined according to the converted color values of the pixels. Specifically, for any color channel in the second color space, converted component values of the pixels in the color channel are obtained. The pixels are arranged in ascending order of the converted component values of the pixels in the color channel to obtain a pixel distribution map of the inverted image data in the color channel. The pixel distribution map of the inverted image data in the second color space can be obtained by repeating the foregoing steps. That is, the pixel distribution map of the inverted image data in the second color space may include pixel distribution maps of the inverted image data in color channels in the second color space. Second, value equalization is performed on the inverted color values of the pixels in the range corresponding to the second color space according to the pixel distribution map to obtain the equalized color values of the pixels. Specifically, the terminal may first determine a value mapping parameter according to a pixel distribution map of the inverted image data in a target color channel and a range of the target color channel, the target color channel being an S channel or a V channel in the second color space. The terminal then calculates a converted component value of a target pixel in the target color channel according to the value mapping parameter to obtain an equalized component value of the target pixel in the target color channel. An equalized color value of the target pixel may be determined according to the equalized component value of the target pixel in the target color channel. The range of the target color channel mentioned in this embodiment of this disclosure is [0, 1]. For a specific implementation process in this implementation, reference may be made to related descriptions of step S203 or step S404 in the foregoing embodiments of this disclosure, and details are not described herein again.

Step S605: Convert the equalized color values of the pixels from the second color space to the first color space after the equalized color values of the pixels are obtained to obtain digital color values of the pixels.

Step S606: Obtain digital image data of the negative image according to the digital color values of the pixels.

In this embodiment of this disclosure, because the negative records colors are opposite to true colors, after the negative image is obtained, the negative image may be first inverted to obtain the inverted image data. The inverted image data includes the inverted color values of the pixels. Then inverted color values of the pixels may be converted from the first color space to the second color space to obtain converted color values of the pixels. Value equalization is performed on the converted color values of the pixels in the range corresponding to the second color space to obtain the equalized color values of the pixels. The equalized color values of the pixels are converted from the second color space to the first color space to obtain the digital color values of the pixels. The digital color values can more accurately reflect true colors, thereby improving the accuracy of the digital image data of the negative image obtained according to the digital color values. It can be learned from the foregoing image processing procedure that, in this embodiment of this disclosure, it is unnecessary to develop a negative film by using a complex darkroom developing technology, and it is also unnecessary to train a model by using a large quantity of negative images, thereby reducing the complexity of image processing to some extent and improving the feasibility of the image processing.

Figure 7:
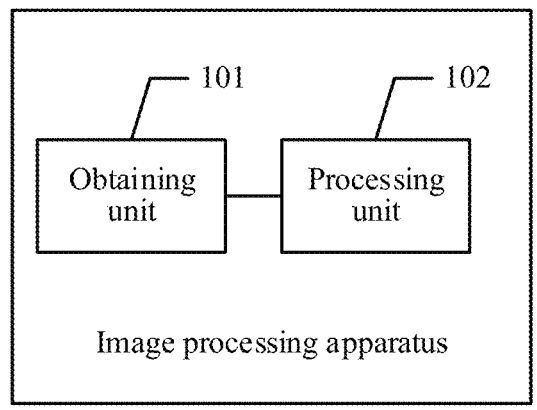
FIG. 7 is a schematic structural diagram of an image processing apparatus according to an embodiment of this disclosure.

Based on the description of the foregoing method embodiments, in an embodiment, the embodiments of this disclosure provide a schematic structural diagram of an image processing apparatus shown in FIG. 7. The image processing apparatus may be run on an intelligent terminal and may be a computer program (including program code) run on the intelligent terminal. As shown in FIG. 7, the image processing apparatus in this embodiment of this disclosure may include:

an obtaining unit 101, configured to obtain a to-be-processed negative image and initial color values of pixels in the negative image in a first color space; and a processing unit 102, configured to invert the negative image to obtain inverted image data, inverted color values of pixels in the inverted image data being determined according to the initial color values of the pixels in the negative image;

the processing unit 102 being configured to perform value equalization on intermediate color values of the pixels in a range corresponding to a second color space according to the inverted image data, to obtain digital color values of the pixels, and the processing unit 102 being configured to obtain digital image data of the negative image according to the digital color values of the pixels.

In some embodiments, in a case that the first color space is the same as the second color space and is a target color space, the intermediate color values include the inverted color values.

In some embodiments, in a case that the first color space is different from the second color space, the intermediate color values include converted color values obtained by converting the inverted color values.

The processing unit 102 is further configured to convert the inverted color values of the pixels in the inverted image data from the first color space to the second color space to obtain converted color values of the pixels.

The processing unit 102 is further configured to perform value equalization on the converted color values of the pixels in the range corresponding to the second color space, to obtain equalized color values of the pixels; and convert the equalized color values of the pixels from the second color space to the first color space to obtain the digital color values of the pixels.

Based on the description of the foregoing method embodiments, in an embodiment, the modules and units in the image processing apparatus, shown in FIG. 7, provided in this embodiment in this disclosure may further have the following functions.

The obtaining unit 101 is configured to obtain a to-be-processed negative image and initial color values of pixels in the negative image in a target color space.

The processing unit 102 is configured to invert the negative image to obtain inverted image data, inverted color values of pixels in the inverted image data being determined according to the initial color values of the pixels in the negative image.

The processing unit 102 is configured to perform value equalization on inverted color values of pixels in a range corresponding to the target color space according to the inverted image data, to obtain digital color values of the pixels.

The processing unit 102 is configured to obtain digital image data of the negative image according to the digital color values of the pixels.

In an implementation, the initial color values include initial component values of the pixels in color channels in the target color space. Correspondingly, when inverting the negative image to obtain the inverted image data, the processing unit 102 may be specifically configured to: obtain a range of a target color channel, the target color channel being any color channel in the target color space; calculate differences between the initial component values of the pixels in the negative image in the target color channel and a maximum value of the range of the target color channel to obtain inverted component values of the pixels in the target color channel; and obtain the inverted image data according to the inverted component values of the pixels in the target color channel.

In an implementation, when performing value equalization on the inverted color values of the pixels in a range corresponding to the target color space according to the inverted image data, to obtain digital color values of the pixels, the processing unit 102 may be specifically configured to: obtain a pixel distribution map of the inverted image data in the target color space; and perform value equalization on the inverted color values of the pixels in a range corresponding to the target color space according to the pixel distribution map, to obtain the digital color values of the pixels.

In an implementation, the pixel distribution map includes pixel distribution maps of the inverted image data in color channels in the target color space, and the target color space includes an RGB color space. Correspondingly, when performing value equalization on the inverted color values of the pixels in a range corresponding to the target color space according to the pixel distribution map, to obtain the digital color values of the pixels, the processing unit 102 may be specifically configured to: determine a value mapping parameter according to a pixel distribution map of the inverted image data in a target color channel and a range of the target color channel, the target color channel being any one of the following channels: an R channel, a G channel, or a B channel; calculate an inverted component value of a target pixel in the inverted image data in the target color channel according to the value mapping parameter, to obtain a digital component value of the target pixel in the target color channel; and determine a digital color value of the target pixel according to the digital component value of the target pixel in the target color channel.

In an implementation, the pixel distribution map is a color histogram. Correspondingly, when determining the value mapping parameter according to the pixel distribution map of the inverted image data in the target color channel and the range of the target color channel, the processing unit 102 may be specifically configured to: determine a total area of the color histogram of the inverted image data in the target color channel; determine a first inverted component value and a second inverted component value from the inverted component values of the pixels in the target color channel based on the total area, a ratio of a local area determined according to the first inverted component value and a minimum inverted component value to the total area meeting a proportion condition, and a ratio of a local area determined according to the second inverted component value and a maximum inverted component value to the total area meeting the proportion condition; and calculate the value mapping parameter according to a value range formed by the first inverted component value and the second inverted component value and the range of the target color channel.

In an implementation, an inverted component value of the target pixel is not less than the first inverted component value and is not greater than the second inverted component value. When performing value equalization on the inverted color values of the pixels in a range corresponding to the target color space according to the pixel distribution map, to obtain the digital color values of the pixels, the processing unit 102 may be further configured to: set, in a case that a first pixel with an inverted component value in the target color channel less than the first inverted component value exists, a digital component value of the first pixel in the target color channel to a minimum value of the range of the target color channel; and set, in a case that a second pixel with an inverted component value in the target color channel greater than the second inverted component value exists, a digital component value of the second pixel in the target color channel to a maximum value of the range of the target color channel.

In an implementation, when obtaining the digital image data of the negative image according to the digital color values of the pixels, the processing unit 102 may be specifically configured to: obtain digital colors corresponding to the digital color values of the pixels; obtain a color lookup table of the inverted image data according to value mapping relationships between the inverted color values of the pixels and the digital color values, the color lookup table including correspondences between the inverted color values of the pixels in the inverted image data and the digital colors; and use the inverted image data and the color lookup table as the digital image data of the negative image.

In an implementation, the processing unit 102 may be further configured to: input, in response to an image display request, the color lookup table and the inverted image data into a rendering engine for rendering, to obtain a digital image; and display the rendered digital image.

In this embodiment of this disclosure, because the negative records colors opposite to true colors, after the initial color values of the pixels in the negative image in the target color space are obtained, the negative image may be first inverted to obtain inverted image data. The inverted image data includes the inverted color values of the pixels. Then value equalization may be performed on the inverted color values of the pixels in a range corresponding to the target color space according to the inverted image data, so that the digital color values of the pixels obtained through the value equalization can more accurately reflect true colors, thereby improving the accuracy of the digital image data of the negative image obtained according to the digital color values. It can be learned from the foregoing image processing procedure that, in this embodiment of this disclosure, it is unnecessary to develop a negative by using a complex darkroom developing technology, and it is also unnecessary to train a model by using a large quantity of negative images, thereby reducing the complexity of image processing to some extent, and improving the feasibility of the image processing.

Figure 8:
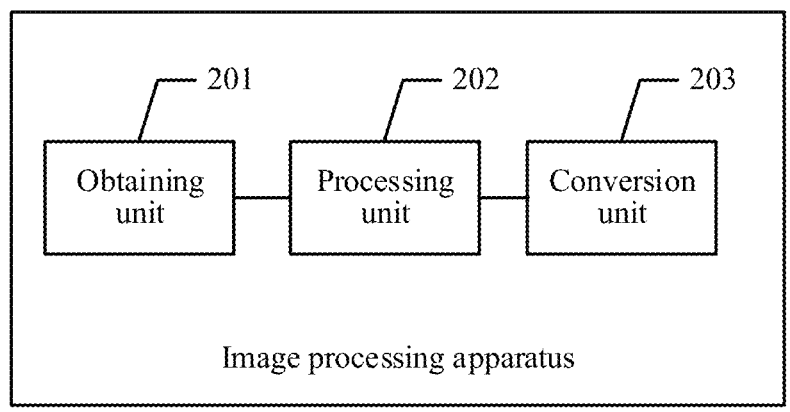
FIG. 8 is a schematic structural diagram of an image processing apparatus according to another embodiment of this disclosure.

In an embodiment of this disclosure, the embodiments of this disclosure further provide a schematic structural diagram of an image processing apparatus shown in FIG. 8. The image processing apparatus may be run on an intelligent terminal and may be a computer program (including program code) run on the intelligent terminal. As shown in FIG. 8, the image processing apparatus in this embodiment of this disclosure may include:

an obtaining unit 201, configured to obtain a to-be-processed negative image and initial color values of pixels in the negative image in a first color space;

a processing unit 202, configured to invert the negative image to obtain inverted image data, inverted color values of pixels in the inverted image data being determined according to the initial color values of the pixels in the negative image; and a conversion unit 203, configured to convert the inverted color values of the pixels in the inverted image data from the first color space to a second color space to obtain converted color values of the pixels, the processing unit 202 being configured to perform value equalization on the converted color values of the pixels in a range corresponding to the second color space, to obtain equalized color values of the pixels, the conversion unit 203 being configured to convert the equalized color values of the pixels from the second color space to the first color space to obtain digital color values of the pixels, and the processing unit 202 being configured to obtain digital image data of the negative image according to the digital color values of the pixels.

In an implementation, the first color space is an RGB color space, and the second color space is an HSV color space.

In an implementation, when performing value equalization on the converted color values of the pixels in the range corresponding to the second color space to obtain the equalized color values of the pixels, the processing unit 202 may be specifically configured to: determine a pixel distribution map of the inverted image data in the second color space according to the converted color values of the pixels; and perform value equalization on the converted color values of the pixels in the range corresponding to the second color space according to the pixel distribution map, to obtain the equalized color values of the pixels.

In an implementation, the pixel distribution map includes pixel distribution maps of the inverted image data in color channels in the second color space, and the second color space is an HSV color space. Correspondingly, when performing value equalization on the converted color values of the pixels in the range corresponding to the second color space according to the pixel distribution map, to obtain the equalized color values of the pixels, the processing unit 202 may be specifically configured to: determine a value mapping parameter according to a pixel distribution map of the inverted image data in a target color channel and a range of the target color channel, the target color channel being an S channel or a V channel in the second color space; calculate a converted component value of a target pixel in the target color channel according to the value mapping parameter, to obtain an equalized component value of the target pixel in the target color channel; and determine an equalized color value of the target pixel according to the equalized component value of the target pixel in the target color channel.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In this embodiment of this disclosure, because the negative records colors are opposite to true colors, after the negative image is obtained, the negative image may be first inverted to obtain the inverted image data. The inverted image data includes the inverted color values of the pixels. Then inverted color values of the pixels may be converted from the first color space to the second color space to obtain converted color values of the pixels. Value equalization is performed on the converted color values of the pixels in the range corresponding to the second color space, to obtain the equalized color values of the pixels. The equalized color values of the pixels are converted from the second color space to the first color space to obtain the digital color values of the pixels. The digital color values can more accurately reflect true colors, thereby improving the accuracy of the digital image data of the negative image obtained according to the digital color values. It can be learned from the foregoing image processing procedure that, in this embodiment of this disclosure, it is unnecessary to develop a negative by using a complex darkroom developing technology, and it is also unnecessary to train a model by using a large quantity of negative images, thereby reducing the complexity of image processing to some extent, and improving the feasibility of the image processing.

Figure 9:
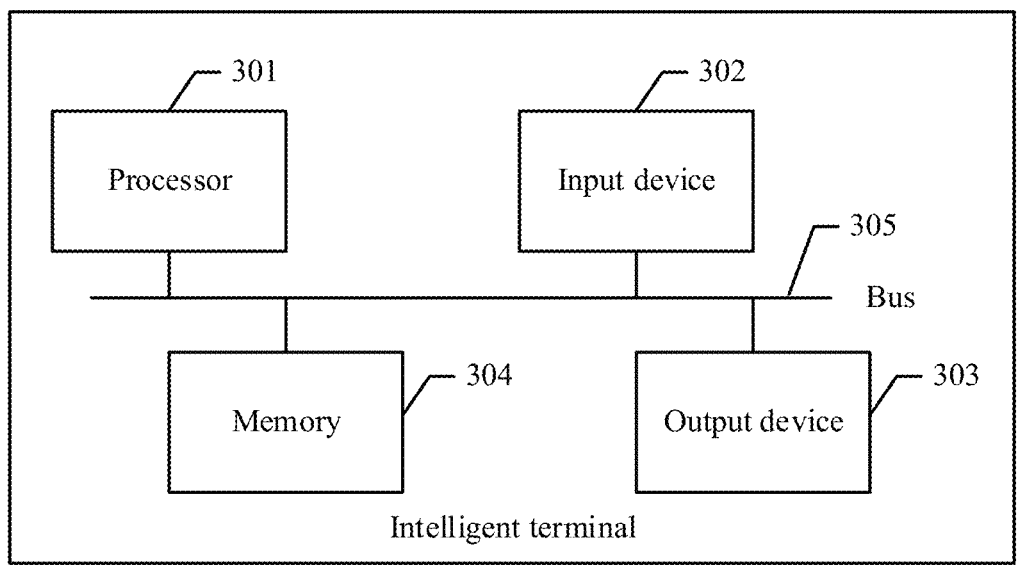
FIG. 9 is a schematic structural diagram of an intelligent terminal according to an embodiment of this disclosure.

Based on the above, the embodiments of this disclosure further provide a schematic structural diagram of an intelligent terminal in FIG. 9. As shown in FIG. 9, the intelligent terminal may include: one or more processors 301, one or more input devices 302, one or more output devices 303, and a memory 304. The processor 301, the input device 302, the output device 303, and the memory 304 are connected through a bus 305. The memory 304 is configured to store a computer program, and the computer program includes program instructions. The processor 301 is configured to execute the program instructions stored in the memory 304, to perform the image processing method shown in FIG. 2A, FIG. 2B, FIG. 4, or FIG. 6.

In an embodiment, the processor 301 may be a central processing unit (CPU). The processor may be alternatively another general-purpose processor, that is, a microprocessor or any conventional processor. The memory 304 may include a read-only memory (ROM) and a random access memory (RAM), and provide the instructions and data to the processor 301. Therefore, the processor 301 and the memory 304 are not limited herein.

The embodiments of this disclosure further provide a computer storage medium, the computer storage medium storing computer program instructions. The processor 301 may load and execute one or more computer program instructions stored in the computer storage medium, to implement corresponding steps of the method in the embodiment corresponding to FIG. 2A, FIG. 2B, FIG. 4, or FIG. 6. In an embodiment, the computer storage medium stores computer program instructions. The computer program instructions may be loaded by the processor 301 to perform the following steps:

obtaining a to-be-processed negative image and initial color values of pixels in the negative image in a first color space;

inverting the negative image to obtain inverted image data, inverted color values of pixels in the inverted image data being determined according to the initial color values of the pixels in the negative image;

performing value equalization on intermediate color values of the pixels in a range corresponding to a second color space according to the inverted image data, to obtain digital color values of the pixels; and obtaining digital image data of the negative image according to the digital color values of the pixels.

In an implementation, the initial color values include initial component values of the pixels in color channels in the target color space. Correspondingly, when inverting the negative image to obtain the inverted image data, the first computer program instructions may be loaded by the processor 301 to specifically perform the following steps: obtaining a range of a target color channel, the target color channel being any color channel in the target color space; calculating differences between the initial component values of the pixels in the negative image in the target color channel and a maximum value of the range of the target color channel to obtain inverted component values of the pixels in the target color channel; and obtaining the inverted image data according to the inverted component values of the pixels in the target color channel.

In an implementation, when performing value equalization on the inverted color values of the pixels in a range corresponding to the target color space according to the inverted image data, to obtain the digital color values of the pixels, the first computer program instructions may be loaded by the processor 301 to specifically perform the following steps: obtaining a pixel distribution map of the inverted image data in the target color space; and performing value equalization on the inverted color values of the pixels in a range corresponding to the target color space according to the pixel distribution map, to obtain the digital color values of the pixels.

In an implementation, the pixel distribution map includes pixel distribution maps of the inverted image data in color channels in the target color space, and the target color space includes an RGB color space. Correspondingly, when performing value equalization on the inverted color values of the pixels in a range corresponding to the target color space according to the pixel distribution map, to obtain the digital color values of the pixels, the first computer program instructions may be loaded by the processor 301 to specifically perform the following steps: determining a value mapping parameter according to a pixel distribution map of the inverted image data in a target color channel and a range of the target color channel, the target color channel being any one of the following channels: an R channel, a G channel, or a B channel; calculating an inverted component value of a target pixel in the inverted image data in the target color channel according to the value mapping parameter, to obtain a digital component value of the target pixel in the target color channel; and determining a digital color value of the target pixel according to the digital component value of the target pixel in the target color channel.

In an implementation, the pixel distribution map is a color histogram. Correspondingly, when determining the value mapping parameter according to the pixel distribution map of the inverted image data in the target color channel and the range of the target color channel, the first computer program instructions may be loaded by the processor 301 to specifically perform the following steps: determining a total area of the color histogram of the inverted image data in the target color channel; determining a first inverted component value and a second inverted component value from the inverted component values of the pixels in the target color channel based on the total area, a ratio of a local area determined according to the first inverted component value and a minimum inverted component value to the total area meeting a proportion condition, and a ratio of a local area determined according to the second inverted component value and a maximum inverted component value to the total area meeting the proportion condition; and calculating the value mapping parameter according to a value range formed by the first inverted component value and the second inverted component value and the range of the target color channel.

In an implementation, an inverted component value of the target pixel is not less than the first inverted component value and is not greater than the second inverted component value. Correspondingly, when performing value equalization on the inverted color values of the pixels in a range corresponding to the target color space according to the pixel distribution map, to obtain the digital color values of the pixels, the first computer program instructions may be further loaded by the processor 301 to perform the following steps: setting, in a case that a first pixel with an inverted component value in the target color channel less than the first inverted component value exists, a digital component value of the first pixel in the target color channel to a minimum value of the range of the target color channel; and setting, in a case that a second pixel with an inverted component value in the target color channel greater than the second inverted component value exists, a digital component value of the second pixel in the target color channel to a maximum value of the range of the target color channel.

In an implementation, when obtaining the digital image data of the negative image according to the digital color values of the pixels, the first computer program instructions may be further loaded by the processor 301 to specifically perform the following steps: obtaining digital colors corresponding to the digital color values of the pixels; obtaining a color lookup table of the inverted image data according to value mapping relationships between the inverted color values of the pixels and the digital color values, the color lookup table including correspondences between the inverted color values of the pixels in the inverted image data and the digital colors; and using the inverted image data and the color lookup table as the digital image data of the negative image.

In an implementation, the first computer program instructions may be further loaded by the processor 301 to perform the following steps: inputting, in response to an image display request, the color lookup table and the inverted image data into a rendering engine for rendering, to obtain a digital image; and displaying the rendered digital image.

In an implementation, the first color space is an RGB color space, and the second color space is an HSV color space.

In an implementation, when performing value equalization on the converted color values of the pixels in the range corresponding to the second color space to obtain the equalized color values of the pixels, the first computer program instructions may be loaded by the processor 301 to specifically perform the following steps: determining a pixel distribution map of the inverted image data in the second color space according to the converted color values of the pixels; and performing value equalization on the converted color values of the pixels in the range corresponding to the second color space according to the pixel distribution map, to obtain the equalized color values of the pixels.

In an implementation, the pixel distribution map includes pixel distribution maps of the inverted image data in color channels in the second color space, and the second color space is an HSV color space. Correspondingly, when performing value equalization on the converted color values of the pixels in the range corresponding to the second color space according to the pixel distribution map, to obtain the equalized color values of the pixels, the first computer program instructions may be loaded by the processor 301 to specifically perform the following steps: determining a value mapping parameter according to a pixel distribution map of the inverted image data in a target color channel and a range of the target color channel, the target color channel being an S channel or a V channel in the second color space; calculating a converted component value of a target pixel in the target color channel according to the value mapping parameter, to obtain an equalized component value of the target pixel in the target color channel; and determining an equalized color value of the target pixel according to the equalized component value of the target pixel in the target color channel.

In this embodiment of this disclosure, because the negative records colors opposite to true colors, after the initial color values of the pixels in the negative image in the target color space are obtained, the negative image may be first inverted to obtain inverted image data. The inverted image data includes the inverted color values of the pixels. Then value equalization may be performed on the inverted color values of the pixels in a range corresponding to the target color space according to the inverted image data, so that the digital color values of the pixels obtained through the value equalization can more accurately reflect true colors, thereby improving the accuracy of the digital image data of the negative image obtained according to the digital color values. It can be learned from the foregoing image processing procedure that, in this embodiment of this disclosure, it is unnecessary to develop a negative by using a complex darkroom developing technology, and it is also unnecessary to train a model by using a large quantity of negative images, thereby reducing the complexity of image processing to some extent, and improving the feasibility of the image processing.

For a specific working process of the terminal and units described above, reference may be made to the related descriptions in the foregoing embodiments, and details are not described herein again.

A person of ordinary skill in the art may understand that all or some of procedures of the method in the foregoing embodiments may be implemented by a computer program instructing relevant hardware. The program may be stored in a computer-readable storage medium. When the program is executed, the procedures of the foregoing method embodiments may be implemented. The storage medium may be a magnetic disc, an optical disc, a read-only memory, a random access memory, or the like.

The foregoing descriptions are merely some embodiments of this disclosure, and are not intended to limit the scope of this disclosure. A person skilled in the art may understand all or some processes of the foregoing embodiments, and equivalent modifications made according to the claims of this disclosure shall still fall within the scope of the present disclosure.

What is claimed is:

1. An image processing method, performed by a terminal, the method comprising:
    obtaining a to-be-processed negative image, which comprises a plurality of pixels and initial color values of the plurality of pixels in a first color space;
    inverting the negative image to obtain inverted image data, the inverted image data comprising inverted color values of the plurality of pixels and the inverted color values being determined according to the initial color values of the plurality of pixels;
    performing value equalization on intermediate color values of the plurality of pixels in a range corresponding to a second color space according to the inverted image data to obtain digital color values of the plurality of pixels by:
        obtaining a pixel distribution map set of the inverted image data in a target color space; and
        performing the value equalization on the inverted color values of the plurality of pixels in a range corresponding to the target color space according to the pixel distribution map set to obtain the digital color values of the plurality of pixels, wherein: the pixel distribution map set comprises pixel distribution maps of the inverted image data in color channels in the target color space; the target color space comprises an RGB color space; and performing the value equalization on the inverted color values of the plurality of pixels in the range corresponding to the target color space according to the pixel distribution map set to obtain the digital color values of the plurality of pixels comprises:
        determining a value mapping parameter according to one of the pixel distribution maps of the inverted image data in a target color channel and a range of the target color channel, the target color channel being any one of the following channels: an R channel, a G channel, or a B channel;
        calculating an inverted component value of a target pixel in the inverted image data in the target color channel according to the value mapping parameter to obtain a digital component value of the target pixel in the target color channel; and
        determining a digital color value of the target pixel according to the digital component value of the target pixel in the target color channel; and obtaining digital image data of the negative image according to the digital color values of the plurality of pixels.

2. The method according to claim 1, wherein the first color space is the same as the second color space and is the target color space, and the intermediate color values comprise the inverted color values.

3. The method according to claim 2, wherein the initial color values comprise initial component values of the plurality of pixels in color channels in the target color space,
wherein inverting the negative image to obtain the inverted image data comprises:
obtaining a range of a target color channel, the target color channel being any color channel in the target color space;
calculating differences between the initial component values of the plurality of pixels in the target color channel and a maximum value of the range of the target color channel to obtain inverted component values of the plurality of pixels in the target color channel; and
obtaining the inverted image data according to the inverted component values of the plurality of pixels in the target color channel.

4. The method according to claim 3, wherein obtaining the inverted image data according to the inverted component values of the plurality of pixels in the target color channel comprises:
obtaining inverted color values of the plurality of pixels in the target color space according to the inverted component values of the plurality of pixels in the target color channel, the inverted color values comprising inverted component values of the plurality of pixels in the color channels in the target color space; and
obtaining the inverted image data according to the inverted color values of the plurality of pixels in the target color space.

5. The method according to claim 1, wherein each of the pixel distribution map comprises a color histogram, and wherein determining the value mapping parameter according to the pixel distribution map of the inverted image data in the target color channel and the range of the target color channel comprises:
determining a total area of the color histogram of the inverted image data in the target color channel;
determining a first inverted component value from the inverted component values of the plurality of pixels in the target color channel based on the total area, wherein a ratio of a local area determined according to the first inverted component value and a minimum inverted component value to the total area meets a proportion condition;
determining a second inverted component value from the inverted component values of the plurality of pixels in the target color channel based on the total area, wherein a ratio of a local area determined according to the second inverted component value and a maximum inverted component value to the total area meets the proportion condition; and
calculating the value mapping parameter according to a value range, defined by the first inverted component value and the second inverted component value, and the range of the target color channel.

6. The method according to claim 5, wherein the inverted component value of the target pixel is not less than the first inverted component value and is not greater than the second inverted component value; and
performing the value equalization on the inverted color values of the plurality of pixels in the range corresponding to the target color space according to the pixel distribution map set to obtain the digital color values of the plurality of pixels further comprises:
setting, when a first pixel with an inverted component value in the target color channel is less than the first inverted component value, a digital component value of the first pixel in the target color channel to a minimum value of the range of the target color channel; and
setting, when a second pixel with an inverted component value in the target color channel is greater than the second inverted component value, a digital component value of the second pixel in the target color channel to a maximum value of the range of the target color channel.

7. The method according to claim 1, wherein obtaining the digital image data of the negative image according to the digital color values of the plurality of pixels comprises:
obtaining digital colors corresponding to the digital color values of the plurality of pixels;
obtaining a color lookup table of the inverted image data according to value mapping relationships between the inverted color values of the plurality of pixels and the digital color values, the color lookup table comprising correspondences between the inverted color values of the plurality of pixels in the inverted image data and the digital colors; and
using the inverted image data and the color lookup table as the digital image data of the negative image.

8. The method according to claim 7, further comprising:
inputting, in response to an image display request, the color lookup table and the inverted image data into a rendering engine for rendering to obtain a digital image for displaying the digital image.

9. A terminal device, comprising:
at least one processor; and
a memory, the at least one processor and the memory being electrically coupled to each other, the memory storing at least one computer program, and the at least one processor being configured to execute the computer program to cause the terminal device to:
obtain a to-be-processed negative image, which comprises a plurality of pixels and initial color values of the plurality of pixels in a first color space;
invert the negative image to obtain inverted image data, the inverted image data comprising inverted color values of the plurality of pixels and the inverted color values being determined according to the initial color values of the plurality of pixels;
perform value equalization on intermediate color values of the plurality of pixels in a range corresponding to a second color space according to the inverted image data to obtain digital color values of the plurality of pixels,
wherein the first color space is the same as the second color space and is the target color space, and the intermediate color values comprise the inverted color values, and the intermediate color values comprise the inverted color values,
wherein the initial color values comprise initial component values of the plurality of pixels in color channels in the target color space, and
wherein the at least one processor is configured to to invert the negative image to obtain the inverted image data by:
obtaining a range of a target color channel, the target color channel being any color channel in the target color space;

calculating differences between the initial component values of the plurality of pixels in the target color channel and a maximum value of the range of the target color channel to obtain inverted component values of the plurality of pixels in the target color channel; and obtaining the inverted image data according to the inverted component values of the plurality of pixels in the target color channel; and obtaining digital image data of the negative image according to the digital color values of the plurality of pixels.

10. The terminal device according to claim 9, wherein the processor is configured to execute the computer program to cause the terminal device to obtain the digital image data of the negative image according to the digital color values of the plurality of pixels by:

obtaining digital colors corresponding to the digital color values of the plurality of pixels;

obtaining a color lookup table of the inverted image data according to value mapping relationships between the inverted color values of the plurality of pixels and the digital color values, the color lookup table comprising correspondences between the inverted color values of the plurality of pixels in the inverted image data and the digital colors; and using the inverted image data and the color lookup table as the digital image data of the negative image.

11. The terminal device according to claim 9, wherein the processor is configured to execute the computer program to cause the terminal device to perform value equalization on intermediate color values of the plurality of pixels in the range corresponding to the second color space according to the inverted image data to obtain digital color values of the plurality of pixels by: obtaining a pixel distribution map set of the inverted image data in a target color space; and performing the value equalization on the inverted color values of the plurality of pixels in a range corresponding to the target color space according to the pixel distribution map set to obtain the digital color values of the plurality of pixels.

12. A non-transitory computer-readable storage medium, storing computer program instructions, the computer program instructions being adapted to be loaded by a processor to cause a device to:

obtain a to-be-processed negative image, which comprises a plurality of pixels and initial color values of the plurality of pixels in a first color space;

invert the negative image to obtain inverted image data, the inverted image data comprising inverted color values of the plurality of pixels and the inverted color values being determined according to the initial color values of the plurality of pixels;

perform value equalization on intermediate color values of the plurality of pixels in a range corresponding to a second color space according to the inverted image data to obtain digital color values of the plurality of pixels by:

determining a pixel distribution map of the inverted image data in the second color space according to converted color values of the plurality of pixels, wherein the pixel distribution map comprises pixel distribution maps of the inverted image data in color channels in the second color space, and the second color space is an HSV color space;

performing the value equalization on the converted color values of the plurality of pixels in the range corresponding to the second color space according to the pixel distribution map to obtain equalized color values of the plurality of pixels by:

determining a value mapping parameter according to a pixel distribution map of the inverted image data in a target color channel and a range of the target color channel, the target color channel being an S channel or a V channel in the second color space;

calculating a converted component value of a target pixel of the plurality of pixels in the target color channel according to the value mapping parameter to obtain an equalized component value of the target pixel in the target color channel; and determining an equalized color value of the target pixel according to the equalized component value of the target pixel in the target color channel; and converting the equalized color values of the plurality of pixels from the second color space to the first color space to obtain the digital color values of the plurality of pixels; and obtaining digital image data of the negative image according to the digital color values of the plurality of pixels.

13. The non-transitory computer-readable storage medium according to claim 12, wherein the first color space is different from the second color space.

14. The non-transitory computer-readable storage medium according to claim 13, wherein the first color space is an RGB color space, and the second color space is an HSV color space.

15. The non-transitory computer-readable storage medium according to claim 13, wherein the computer program instructions are adapted to be loaded by the processor to cause the device to convert the inverted color values by converting the inverted color values of the plurality of pixels in the inverted image data from the first color space to the second color space to obtain the converted color values of the plurality of pixels.

* * * * *